United States Patent
Kim et al.

(10) Patent No.: US 10,171,153 B2
(45) Date of Patent: Jan. 1, 2019

(54) METHOD AND APPARATUS FOR TRANSMITTING CHANNEL STATE INFORMATION IN WIRELESS COMMUNICATION SYSTEM

(71) Applicant: LG ELECTRONICS INC., Seoul (KR)

(72) Inventors: Hyungtae Kim, Seoul (KR); Hyunho Lee, Seoul (KR); Jonghyun Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 255 days.

(21) Appl. No.: 14/891,057

(22) PCT Filed: Jun. 5, 2014

(86) PCT No.: PCT/KR2014/005012
§ 371 (c)(1),
(2) Date: Nov. 13, 2015

(87) PCT Pub. No.: WO2014/196831
PCT Pub. Date: Dec. 11, 2014

(65) Prior Publication Data
US 2016/0080064 A1 Mar. 17, 2016

Related U.S. Application Data

(60) Provisional application No. 61/831,151, filed on Jun. 5, 2013, provisional application No. 61/862,494, filed (Continued)

(51) Int. Cl.
*H04B 7/04* (2017.01)
*H04L 5/14* (2006.01)
(Continued)

(52) U.S. Cl.
CPC ......... *H04B 7/0639* (2013.01); *H04B 7/0456* (2013.01); *H04B 7/0478* (2013.01); *H04B 7/0626* (2013.01); *H04L 5/14* (2013.01)

(58) Field of Classification Search
CPC .. H04B 7/0639; H04B 7/0456; H04B 7/0626; H04B 7/0478; H04L 5/14; H04L 5/0091; H04L 5/0023
See application file for complete search history.

(56) References Cited

U.S. PATENT DOCUMENTS

| | | | |
|---|---|---|---|
| 2012/0087425 A1* | 4/2012 | Gomadam | H04B 7/0417 375/260 |
| 2012/0218948 A1 | 8/2012 | Onggosanusi et al. | |

(Continued)

FOREIGN PATENT DOCUMENTS

KR 10-2011-0114482 10/2011

OTHER PUBLICATIONS

Motorola, "4 Tx Codebook Design based on Two-Component Framework," 3GPP TSG RAN1 #62, R1-104698, Aug. 2010, 14 pages.
ZTE, "Further Design Refinement and Performance Evaluation of 2-Level codebook for 4Tx LTE-A DL MIMO," 3GPP TSG RAN WG1 Meeting #62, R1-104557, Aug. 2010, 9 pages.
(Continued)

*Primary Examiner* — Redentor Pasia
*Assistant Examiner* — Peter K Mak
(74) *Attorney, Agent, or Firm* — Lee Hong Degerman Kang & Waimey

(57) ABSTRACT

The present invention relates to a wireless communication system. A method for a terminal for transmitting channel state information (CSI) in a wireless communication system according to an embodiment of the present invention comprises the steps of: subsampling a first codebook associated with a first precoding matrix indicator (PMI) and a second codebook associated with a second PMI according to a reporting mode for a four-antenna port; and reporting the (Continued)

| CQI Reporting Mode | | PMI Feedback Type | |
|---|---|---|---|
| | | No PMI | Single PMI |
| PUCCH CQI Feedback Type | Wideband (Wideband CQI) | Mode 1-0 | Mode 1-1 |
| | UE-Selected (Subband CQI) | Mode 2-0 | Mode 2-1 | channel state information on the basis of the subsampled first codebook and second codebook, wherein a second codebook index for the second PMI may have any one index from a first index group if the first codebook index for the first PMI is an odd number, and if same is an even number, may have any one index from a second index group.

14 Claims, 13 Drawing Sheets

Related U.S. Application Data on Aug. 5, 2013, provisional application No. 61/863,910, filed on Aug. 9, 2013.

(51) Int. Cl.
*H04B 7/06* (2006.01)
*H04B 7/0456* (2017.01)

(56) References Cited

U.S. PATENT DOCUMENTS

| | | | |
|---|---|---|---|
| 2012/0314590 A1 | 12/2012 | Choudhury et al. | |
| 2013/0114655 A1* | 5/2013 | Gomadam | H04B 7/0456 375/219 |
| 2014/0369279 A1* | 12/2014 | Yu | H04B 7/0639 370/329 |
| 2017/0324456 A1* | 11/2017 | Prasad et al. | H04B 7/0469 370/329 |

OTHER PUBLICATIONS

PCT International Application No. PCT/KR2014/005012, Written Opinion of the International Searching Authority dated Sep. 18, 2014, 14 pages.

PCT International Application No. PCT/KR2014/005012, Written Opinion of the International Searching Authority dated Sep. 18, 2014, 17 pages.

* cited by examiner (a) Control - Plane Protocol Stack (b) User - Plane Protocol Stack

| CQI Reporting Mode | | PMI Feedback Type | |
|---|---|---|---|
| | | No PMI | Single PMI |
| PUCCH CQI Feedback Type | Wideband (Wideband CQI) | Mode 1-0 | Mode 1-1 |
| | UE-Selected (Subband CQI) | Mode 2-0 | Mode 2-1 |

Report 1   Report 2 w/ PTI=0   Report 3 w/ PTI=0

Report 2 w/ PTI=1   Report 3 w/ PTI=1

(a)

(b)

METHOD AND APPARATUS FOR TRANSMITTING CHANNEL STATE INFORMATION IN WIRELESS COMMUNICATION SYSTEM

CROSS-REFERENCE TO RELATED APPLICATIONS

International Application No. PCT/KR2014/005012, filed on Jun. 5, 2014, which claims the benefit of U.S. Provisional Application Nos. 61/831,151, filed on Jun. 5, 2013, 61/862,494, filed on Aug. 5, 2013, and 61/863,910, filed on Aug. 9, 2013, the contents of which are all hereby incorporated by reference herein in their entirety.

TECHNICAL FIELD

The present invention relates to a wireless communication system, and more particularly, to a method of transmitting channel state information using subsampling in a wireless communication system and an apparatus therefor.

BACKGROUND ART

A 3rd generation partnership project long term evolution (3GPP LTE) communication system will be described below as an exemplary mobile communication system to which the present invention is applicable.

FIG. 1 is a diagram schematically showing a network structure of an evolved universal mobile telecommunications system (E-UMTS) as an exemplary radio communication system. The E-UMTS system has evolved from the conventional UMTS system and basic standardization thereof is currently underway in the 3GPP. The E-UMTS may be generally referred to as a long term evolution (LTE) system. For details of the technical specifications of the UMTS and E-UMTS, refer to Release 7 and Release 8 of "3rd generation partnership project; technical specification group radio access network".

Referring to FIG. 1, the E-UMTS includes a user equipment (UE), eNBs (or eNode Bs or base stations), and an access gateway (AG) which is located at an end of a network (E-UTRAN) and connected to an external network. The eNBs may simultaneously transmit multiple data streams for a broadcast service, a multicast service, and/or a unicast service.

One or more cells may exist per eNB. A cell is set to use one of bandwidths of 1.25, 2.5, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and hybrid automatic repeat and request (HARQ)-related information. In addition, the eNB transmits uplink scheduling information with respect to UL data to a corresponding UE to inform the UE of an available time/frequency domain, coding, data size, and HARQ-related information. An interface for transmitting user traffic or control traffic may be used between eNBs. A core network (CN) may include the AG, a network node for user registration of the UE, and the like. The AG manages mobility of a UE on a tracking area (TA) basis, wherein one TA includes a plurality of cells.

Although radio communication technology has been developed up to LTE based on wideband code division multiple access (WCDMA), the demands and expectations of users and providers continue to increase. In addition, since other radio access technologies continue to be developed, new technology is required to secure competitiveness in the future. For example, decrease of cost per bit, increase of service availability, flexible use of a frequency band, simple structure, open interface, and suitable power consumption by a UE are required.

A MIMO (multiple input multiple output) technology corresponds to a method capable of enhancing data transmission and reception efficiency by selecting multiple transmission antennas and multiple reception antennas instead of a single transmission antenna and a single reception antenna. In particular, the MIMO technology corresponds to a technology for increasing capability and improving performance using multiple antennas used by a transmitting end or a receiving end of a wireless communication system. The MIMO technology can also be called a multi-antenna technology.

In order to support multi-antenna transmission, it may be able to apply a precoding matrix configured to appropriately distribute transmission information to each antenna according to a channel status and the like.

DISCLOSURE OF THE INVENTION

Technical Task

An object of the present invention devised to solve the problem lies in a method and device for reporting channel state information in a radio communication system.

It is to be understood that both the foregoing general description and the following detailed description of the present invention are exemplary and explanatory and are intended to provide further explanation of the invention as claimed.

Technical Solution

To achieve these and other advantages and in accordance with the purpose of the present invention, as embodied and broadly described, according to one embodiment, a method of transmitting channel state information (CSI), which is transmitted by a user equipment in a wireless communication system, includes the steps of subsampling a first codebook associated with a first PMI (precoding matrix indicator) and a second codebook associated with a second PMI according to a reporting submode for 4 antenna ports and reporting channel state information based on the subsampled first codebook and the second codebook. In this case, if a first codebook index for the first PMI corresponds to an add number, a second codebook index for the second PMI may have an index belonging to a first index group. If the first codebook index corresponds to an even number, the second codebook index for the second PMI may have an index belonging to a second index group.

To further achieve these and other advantages and in accordance with the purpose of the present invention, according to a different embodiment, a user equipment transmitting channel state information (CSI) in a wireless communication system can include an RF (radio frequency) unit and a processor, the processor configured to subsample a first codebook associated with a first PMI (precoding matrix indicator) and a second codebook associated with a second PMI according to a reporting submode for 4 antenna ports, the processor configured to report channel state information based on the subsampled first codebook and the second codebook. In this case, if a first codebook index for the first PMI corresponds to an add number, a second codebook index for the second PMI may have an index belonging to a first index group. If the first codebook index corresponds to an even number, the second codebook index for the second PMI may have an index belonging to a second index group.

Following items can be commonly applied to the various embodiments according to the present invention.

If a rank corresponds to 1 and the first codebook index corresponds to an even number, the second codebook index may have a value selected from the group consisting of 0, 2, 8 and 10.

If a rank corresponds to 1 and the first codebook index corresponds to an odd number, the second codebook index may have a value selected from the group consisting of 4, 6, 12 and 14.

If a rank corresponds to 2 and the first codebook index corresponds to an even number, the second codebook index may have a value of either 0 or 4.

If a rank corresponds to 3 and the first codebook index corresponds to an odd number, the second codebook index has a value of either 2 or 6.

The first PMI corresponds to a PMI of a wideband/long-term, the second PMI corresponds to a PMI of a narrowband/short-term and a final PMI can be determined based on the first PMI and the second PMI.

The reporting submode may correspond to a second submode of a PUCCH (physical uplink control channel) mode 1-1 reporting a PMI and a wideband CQI (channel quality indicator).

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Mode for Invention

The configuration, operation and other features of the present invention will be understood by the embodiments of the present invention described with reference to the accompanying drawings. The following embodiments are examples of applying the technical features of the present invention to a 3rd generation partnership project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Figure 1:
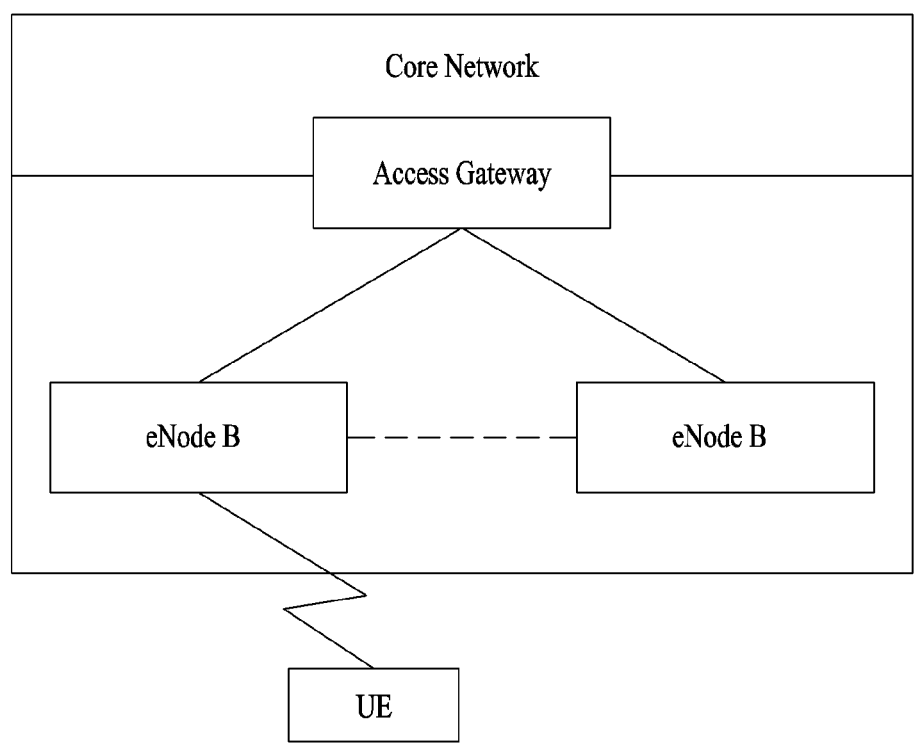
FIG. 1 is a diagram schematically showing a network structure of an evolved universal mobile telecommunications system (E-UMTS) as an exemplary radio communication system.
Figure 2:
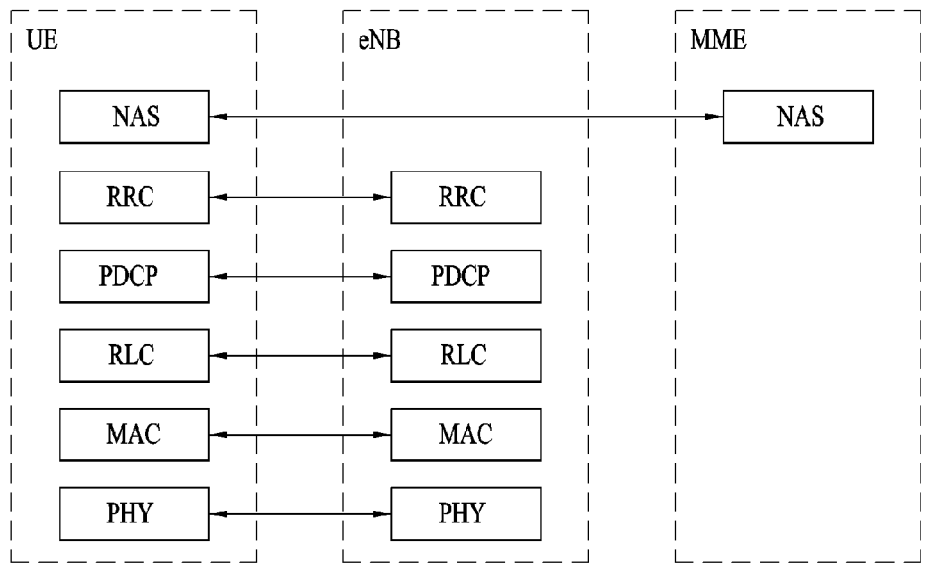
FIGS. 2(a) and 2(b) are diagrams illustrating a control plane and a user plane of a radio interface protocol between a UE and an evolved universal terrestrial radio access network (E-UTRAN) based on a 3rd generation partnership project (3GPP) radio access network standard.
Figure 2:
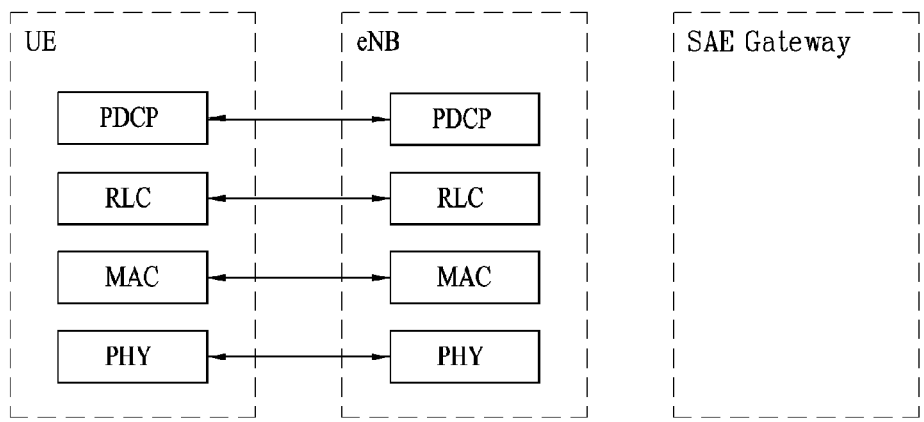

FIG. 2(a) is a diagram illustrating a control plane, and FIG. 2(b) is a diagram illustrating a user plane of a radio interface protocol between a UE and an evolved universal terrestrial radio access network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an orthogonal frequency division multiple access (OFDMA) scheme in downlink and is modulated using a single-carrier frequency division multiple access (SC-FDMA) scheme in uplink.

A medium access control (MAC) layer of a second layer provides a service to a radio link control (RLC) layer of a higher layer via a logical channel. The RLC layer of the second layer supports reliable data transmission. The function of the RLC layer may be implemented by a functional block within the MAC. A packet data convergence protocol (PDCP) layer of the second layer performs a header compression function to reduce unnecessary control information for efficient transmission of an Internet protocol (IP) packet such as an IPv4 packet or an IPv6 packet in a radio interface having a relatively small bandwidth.

A radio resource control (RRC) layer located at the bottom of a third layer is defined only in the control plane and is responsible for control of logical, transport, and physical channels in association with configuration, re-configuration, and release of radio bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a random access channel (RACH) for transmission of initial control messages and an uplink SCH for transmission of user traffic or control messages. Logical channels, which are located above the transport channels and are mapped to the transport channels, include a broadcast control channel (BCCH), a paging control channel (PCCH), a common control channel (CCCH), a multicast control channel (MCCH), and a multicast traffic channel (MTCH).

Figure 3:
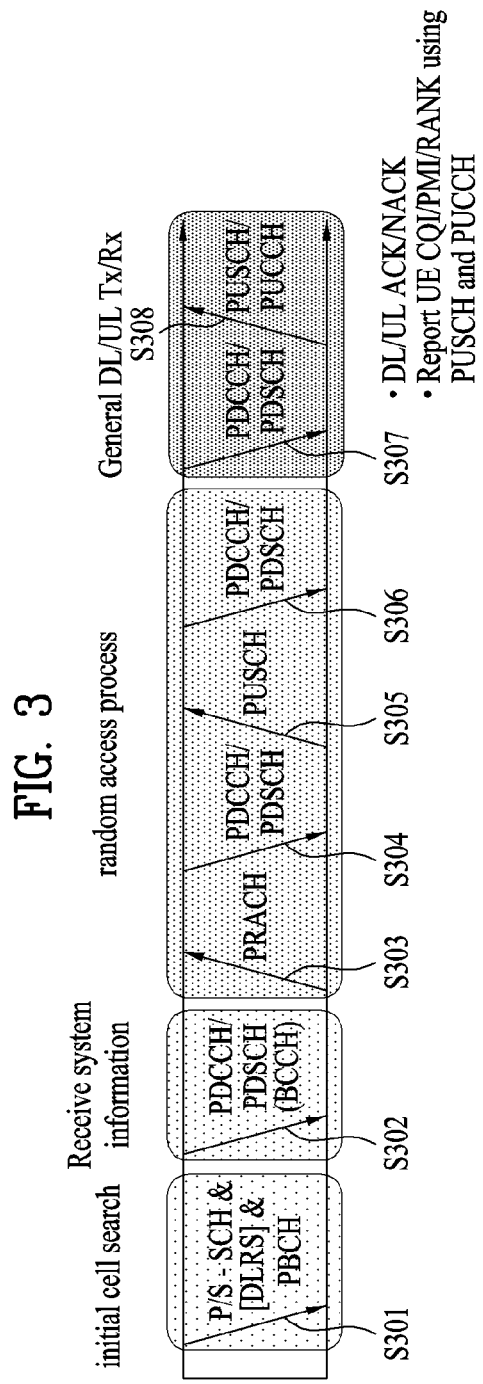
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). To this end, the UE may receive a Primary synchronization channel (P-SCH) and a secondary synchronization channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. To this end, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and physical uplink shared channel (PUSCH)/physical uplink control channel (PUCCH) transmission (S308) as a general uplink/downlink signal transmission procedure. In particular, the UE receives downlink control information (DCI) through the PDCCH. Here, the DCI contains control information such as resource allocation information about a UE and has different formats according to according to different usages of DCI.

The control information transmitted from the UE to the eNB in uplink or transmitted from the eNB to the UE in downlink includes a downlink/uplink ACK/NACK signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
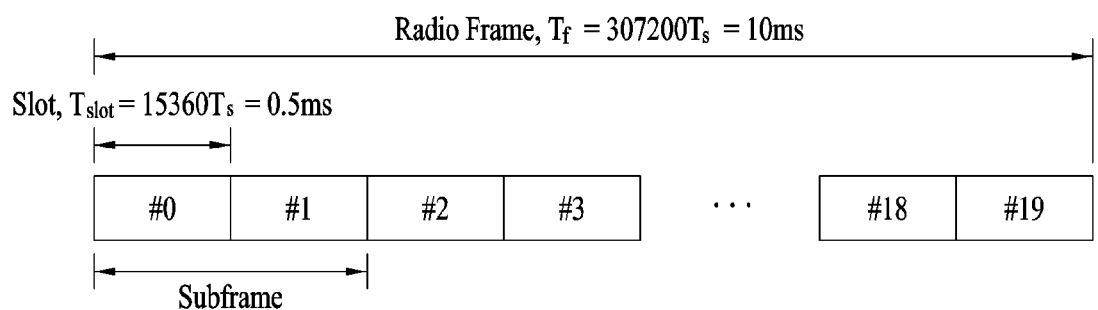
FIG. 4 is a diagram illustrating an example of the structure of a radio frame used in a long term evolution (LTE) system.

FIG. 4 is a diagram illustrating an example of the structure of a radio frame used in an LTE system.

Referring to FIG. 4, a radio frame has a length of 10 ms (327200×Ts) and includes ten subframes having an equal size. Each subframe has a length of 1 ms and includes two slots each having a length of 0.5 ms (15360×Ts). Here, Ts denotes a sampling time, which is represented as $Tx=1/(15 kHz \times 2048)=3.2552 \times 10-8$ (approximately 33 ns). A slot includes a plurality of orthogonal frequency division multiplexing (OFDM) symbols in the time domain and a plurality of resource blocks in the frequency domain. In the LTE system, one resource block includes 12 subcarriers×7(6) OFDM symbols. A unit time for transmitting data, transmission time interval (TTI), may be set to one or more subframes. The above-described radio frame structure is exemplary and the number of subframes included in the radio frame, the number of slots included in one subframe, and the number of OFDM symbols or SC-FDMA symbols included in each slot may be changed in various manners.

Figure 5:
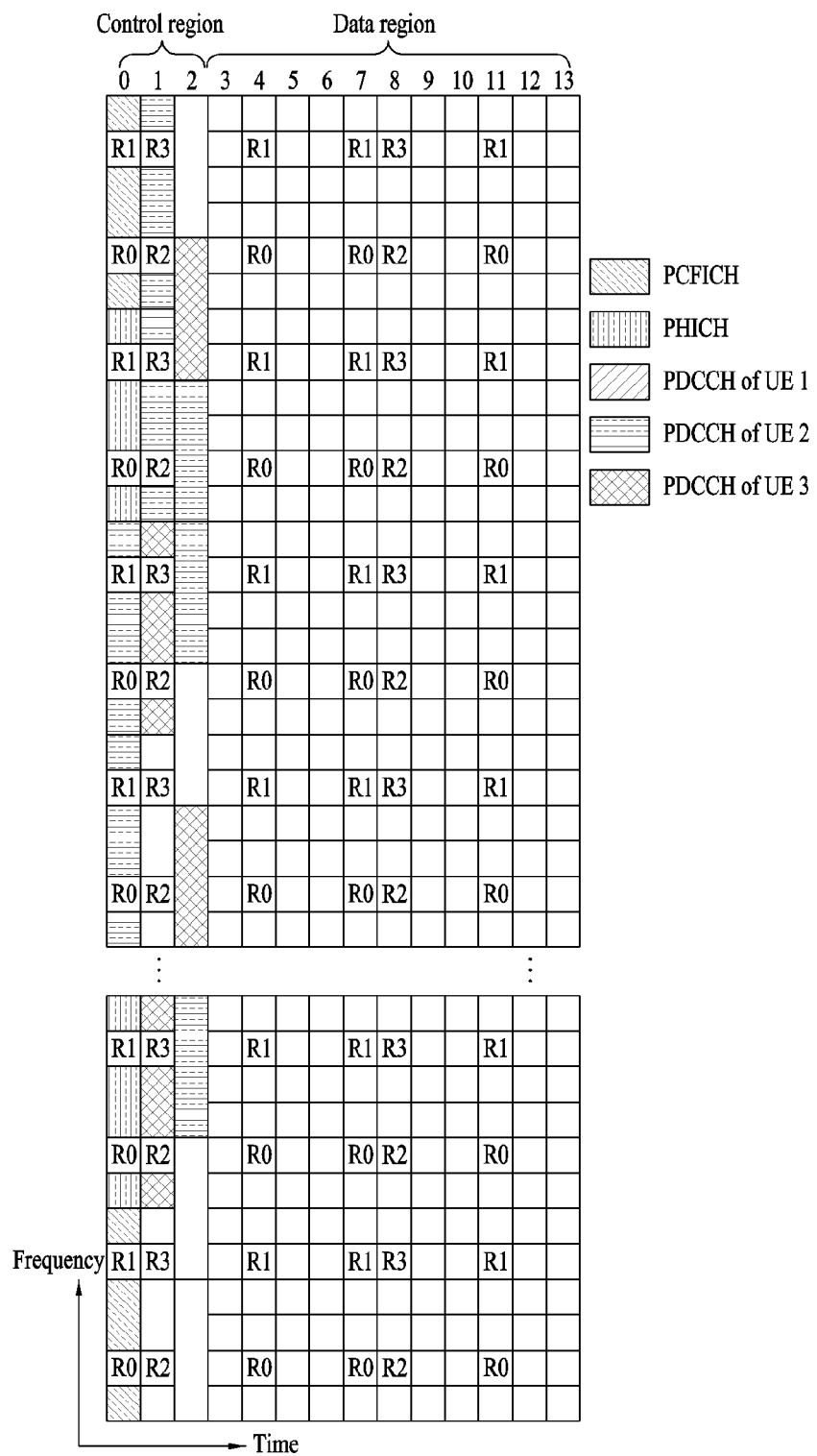
FIG. 5 is a diagram illustrating a control channel included in a control region of a subframe in a downlink radio frame.

FIG. 5 is a diagram illustrating a control channel included in a control region of a subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe settings. In FIG. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a physical control format indicator channel (PCFICH), physical hybrid-arq indicator channel (PHICH), physical downlink control channel (PDCCH), etc.

The physical control format indicator channel (PCFICH) informs the UE of the number of OFDM symbols used for the PDCCH per subframe. The PCFICH is located at a first OFDM symbol and is set prior to the PHICH and the PDCCH. The PCFICH includes four resource element groups (REGs) and the REGs are dispersed in the control region based on a cell identity (ID). One REG includes four resource elements (REs). An RE indicates a minimum physical resource defined as one subcarrier×one OFDM symbol. The PCFICH has a value of 1 to 3 or 2 to 4 and is modulated using a quadrature phase shift keying (QPSK) scheme.

The physical Hybrid-ARQ indicator channel (PHICH) is used to transmit HARQ ACK/NACK for uplink transmission. That is, the PHICH refers to a channel in which DL ACK/NACK information for UL HARQ is transmitted. The PHICH includes one REG and is scrambled on a cell-specific basis. ACK/NACK is indicated by one bit and is modulated using binary phase shift keying (BPSK). The modulated ACK/NACK is spread with a spreading factor (SF) of 2 or 4. A plurality of PHICHs mapped to the same resource constitutes a PHICH group. The number of multiplexed PHICHs in the PHICH group is determined according to the number of SFs. The PHICH (group) is repeated through times in order to acquire diversity gain in the frequency domain and/or time domain.

The physical downlink control channel (PDCCH) is allocated to the first n OFDM symbols of a subframe. Here, n is an integer of 1 or more and is indicated by a PCFICH. The PDCCH includes one or more control channel elements (CCEs). The PDCCH informs each UE or a UE group of information associated with resource allocation of a paging channel (PCH) and a downlink-shared channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 6:
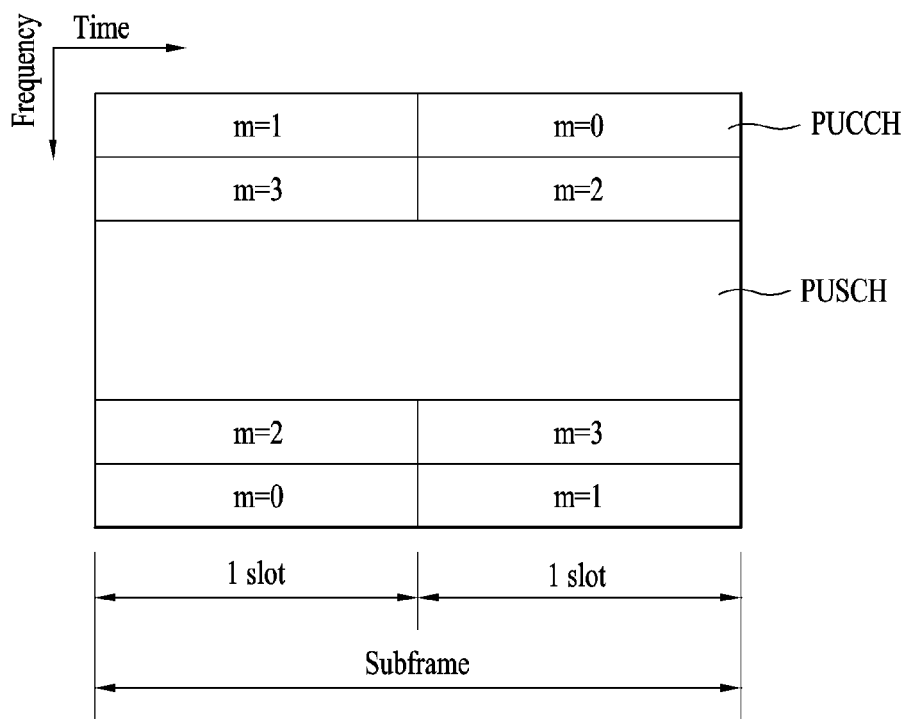
FIG. 6 is a diagram illustrating an uplink subframe structure used in an LTE system.

FIG. 6 is a diagram illustrating an uplink subframe structure used in an LTE system.

Referring to FIG. 6, a UL subframe may be divided into a region to which physical uplink control channel (PUCCH) for carrying control information is allocated and a region to which physical uplink shared channel (PUSCH) for carrying user data is allocated. The middle of the subframe is allocated to the PUSCH, while both sides of the data region in the frequency domain are allocated to the PUCCH. Control information transmitted on the PUCCH may include a Hybrid Automatic Repeat request acknowledgement/negative acknowledgement (HARQ ARCK/NACK), a Channel Quality Indicator (CQI) representing a downlink channel state, a rank indicator (RI) for multiple input multiple output (MIMO), a scheduling request (SR) requesting uplink resource allocation. A PUCCH for one UE uses one resource block that occupies different frequencies in slots in a subframe. That is, two resource blocks allocated to the PUCCH is frequency hopped at a slot boundary. In particular, PUCCHs with m=0, m=1, and m=2 are allocated to a subframe in FIG. 6.

Multiple Input Multiple Output (MIMO) System

Now a description will be given of a Multiple Input Multiple Output (MIMO) system. MIMO can increase the transmission and reception efficiency of data by using a plurality of transmission (Tx) antennas and a plurality of reception (Rx) antennas. That is, with the use of multiple antennas at a transmitter or a receiver, MIMO can increase capacity and improve performance in a wireless communication system. The term "MIMO" is interchangeable with "multi-antenna".

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
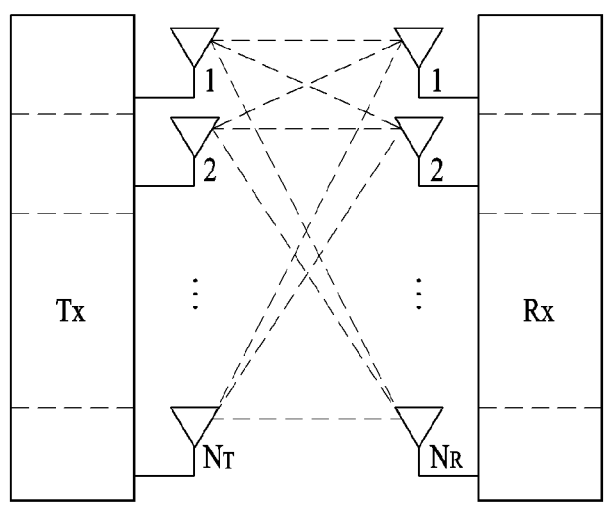
FIG. 7 illustrates the configuration of a typical multiple input multiple output (MIMO) communication system.

FIG. 7 illustrates the configuration of a typical MIMO communication system. Referring to FIG. 7, a transmitter has NT Tx antennas and a receiver has NR Rx antennas. The simultaneous use of a plurality of antennas at both the transmitter and the receiver increases a theoretical channel transmission capacity, compared to use of a plurality of antennas at only one of the transmitter and the receiver. The channel transmission capacity increases in proportion to the number of antennas. Therefore, transmission rate and frequency efficiency are increased. Given a maximum transmission rate Ro that may be achieved with a single antenna, the transmission rate may be increased, in theory, to the product of Ro and a transmission rate increase rate Ri in the case of multiple antennas. Ri is the smaller value between NT and NR.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with NT Tx antennas and NR Rx antennas as illustrated in FIG. 7 will be described in detail through mathematical modeling. Regarding a transmission signal, up to NT pieces of information can be transmitted through the NT Tx antennas, as expressed as the vector shown in Equation 2 below.

$$s = [s_1, s_2, \ldots, s_{N_T}]^T \quad \text{[Equation 2]}$$

A different transmission power may be applied to each piece of transmission information, $s_1, s_2, \ldots s_{N_T}$. Let the transmission power levels of the transmission information be denoted by $P_1, P_2, \ldots, P_{N_T}$, respectively. Then the transmission power-controlled transmission information vector is given as $$\hat{s}=[\hat{s}_1,\hat{s}_2,\ldots,\hat{s}_{N_T}]^T =[P_1 s_1, P_2 s_2, \ldots, P_{N_T} s_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

NT transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These NT transmission signals are $x_1, x_2, \ldots x_{N_T}$ are represented as a vector x, which may be determined by Equation 5 below. Herein, $w_{ij}$ denotes a weight between a jth piece of information and an ith Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} \qquad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \qquad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \qquad \text{[Equation 7]}$$

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams is transmitted through a plurality of antennas, this may be spatial multiplexing. Needless to say, a hybrid scheme of spatial diversity and spatial multiplexing in combination may be contemplated.

Channel State Information (CSI) Feedback

Channel State Information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO Tx antennas. To acquire CSI from the UE, the eNB may transmit a reference signal (RS) to the UE and may command the UE to feed back measured CSI on a PUCCH or PUSCH.

CSI is classified largely into three information types, RI, PMI, and CQI. An RI is information about a channel rank, as described before. The channel rank is the number of streams that a UE can receive in the same time-frequency resources. Because the RI is determined mainly according to the long-term fading of a channel, the RI may be fed back to an eNB in a longer period than a PMI and a CQI.

A PMI is the index of a UE-preferred eNB precoding matrix determined based on a metric such as signal to interference and noise ratio (SINR), reflecting the spatial characteristics of channels. A CQI represents a channel strength. In general, the CQI reflects a reception SINR that the eNB can achieve with a PMI.

An advanced system such as an LTE-A system considers achievement of an additional multi-user diversity by the use of Multi-User MIMO (MU-MIMO). Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in Single User MIMO (SU-MIMO) should be reported in MU-MIMO.

In this context, the LTE-A standard designs a final PMI separately as a long-term and/or wideband PMI, W1 and a short-term and/or subband PMI, W2.

For example, the long-term covariance matrix of channels expressed as Equation 8 below may be used for hierarchical codebook transformation that configures one final PMI with W1 and W2.

$$W = \text{norm}(W1 W2) \qquad \text{[Equation 8]}$$

In Equation 8 above, W2 is a short-term PMI, which is a codeword of a codebook reflecting short-term channel information, W is a codeword of a final codebook, and norm(A) is a matrix obtained by normalizing the norm of each column of matrix A to 1.

Conventionally, the codewords W1 and W2 are given as Equation 9 below.

$$W1(i) = \begin{bmatrix} X_i & 0 \\ 0 & X_i \end{bmatrix}, \qquad \text{[Equation 9]}$$

where $X_i$ is Nt/2 by M matrix.

$$W2(j) = \begin{bmatrix} \overbrace{e_M^k & e_M^l & \cdots & e_M^m}^{r\ columns} \\ \alpha_j e_M^k & \beta_j e_M^l & \cdots & \gamma_j e_M^m \end{bmatrix} \text{(if rank = } r\text{)},$$

where $1 \leq k, l, m \leq M$ and $k, l, m$ are integer.

Here, Nt is the number of Tx antennas and M is the number of columns of a matrix Xi, which means that the matrix Xi has total M candidate column vectors. $e^k{}_M$, $e^l{}_M$, and $e^m{}_M$ are column vectors that have elements of 0 except for only kth, lth, and mth elements that are 1 among M elements and are kth, lth, and mth column vectors of Xi. $\alpha_j$, $\beta_j$ and $\gamma_j$ are complex values and indicate that phase rotation is applied to the kth, lth, and mth column vectors of the matrix in order to choose these column vectors, respectively. i is an integer equal to or greater than 0 and is a PMI index indicating W1. j is an integer equal to or greater than 0 and is a PMI index indicating W2.

In Equation 9 above, the codewords are designed so as to reflect correlation characteristics between established channels, if cross polarized antennas are arranged densely, for example, the distance between adjacent antennas is equal to or less than a half of a signal wavelength. The cross polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is eventually quantized values of channels, it is necessary to design a codebook, reflecting channel characteristics. For the convenience of description, a rank-1 codeword designed in the above manner may be given as Equation 10 below.

$$W1(i) * W2(j) = \begin{bmatrix} X_i(k) \\ \alpha_j X_i(k) \end{bmatrix} \qquad \text{[Equation 10]}$$

In [Equation 10], a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. Preferably, $X_i(k)$ is expressed as a vector having the linear phase increment property, reflecting the correlation characteristics between antennas in each antenna group. For example, a Discrete Fourier Transform (DFT) matrix may be used for $X_i(k)$.

As described above, CSI in an LTE system includes, but is not limited to, CQI, PMI, and RI. Some or all of CQI, PMI, and RI may be transmitted according to a transmission mode of a UE. A case in which CSI is periodically transmitted is referred to as periodic reporting and a case in which CSI is transmitted according to request of a BS is referred to as aperiodic reporting. In case of aperiodic reporting, a request bit contained in UL scheduling information from the BS is transmitted to the UE. Then, the UE transmits CSI obtained in consideration of a transmission mode of the UE to the BS via a UL data channel (PUSCH). In case of periodic reporting, periods, offset for a corresponding period, etc. are signaled in units of subframes via an upper layer signal for each respective UE in a semi-static manner. Each UE transmits CSI obtained in consideration of a transmission mode of the UE to the BS via a UL control channel (PUCCH) according to a predetermined period. When UL data and CSI are simultaneously present in a subframe for transmitting CSI, the CSI is transmitted through a UL data channel (PUSCH) together with the data. The BS transmits transmission timing information appropriate for each respective UE to the UE in consideration of a channel state of each UE, a distribution state of UEs in a cell, etc. The transmission timing information includes a period, offset, etc. for transmission of CSI and may be transmitted to each UE through an RRC message.

FIGS. 8 to 11 illustrate periodic reporting of CSI in LTE.

Figures 8, 9:
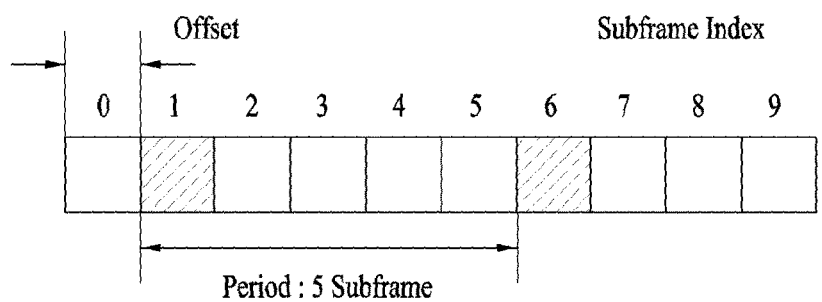
FIGS. 8 to 11 illustrate periodic reporting of channel state information (CSI)

Referring to FIG. 8, an LTE system has four CQI reporting modes. In detail, the CQI reporting mode is classified into WB CQI and SB CQI according to a CQI feedback type and is classified into no PMI and single PMI according to whether PMI is transmitted. Each UE receives information formed by combining a period and offset via RRC signaling in order to periodically report CQI.

FIG. 9 illustrates an example in which a UE transmits CSI when information indicating {period '5' and offset '1'} is signaled to the UE. Referring to FIG. 9, upon receiving the information indicating {period '5' and offset '1'}, the UE transmits CSI in units of 5 subframes with an offset of one subframe in a direction in which a subframe index increases from a 0th subframe. CSI. CSI is basically transmitted via a PUCCH. However, when PUSCH for transmission is present at the same time, CSI is transmitted together with data via PUSCH. A subframe index is formed by combining a system frame number (or a radio frame index)(nf) and a slot index (ns, 0 to 19). Since a subframe includes 2 slots, a subframe index may be defined according to 10*nf+floor (ns/2). floor( ) indicates a rounddown function.

There are a type for transmitting only WB CQI and a type for both WB CQI and SB CQI. In case of the type for transmitting only WB CQI, CQI information about an entire band in a subframe corresponding to every CQI transmission period is transmitted. As illustrated in FIG. 8, when PMI needs to be also transmitted according to a PMI feedback type, PMI information is transmitted together with CQI information. In case of the type for transmitting both WB CQI and SB CQI, WB CQI and SB CQI are alternately transmitted.

Figure 10:
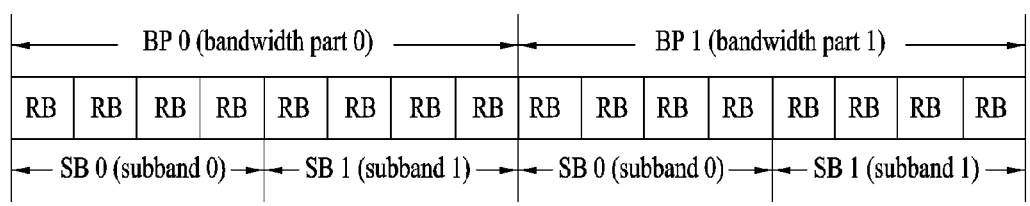
Figure 11:
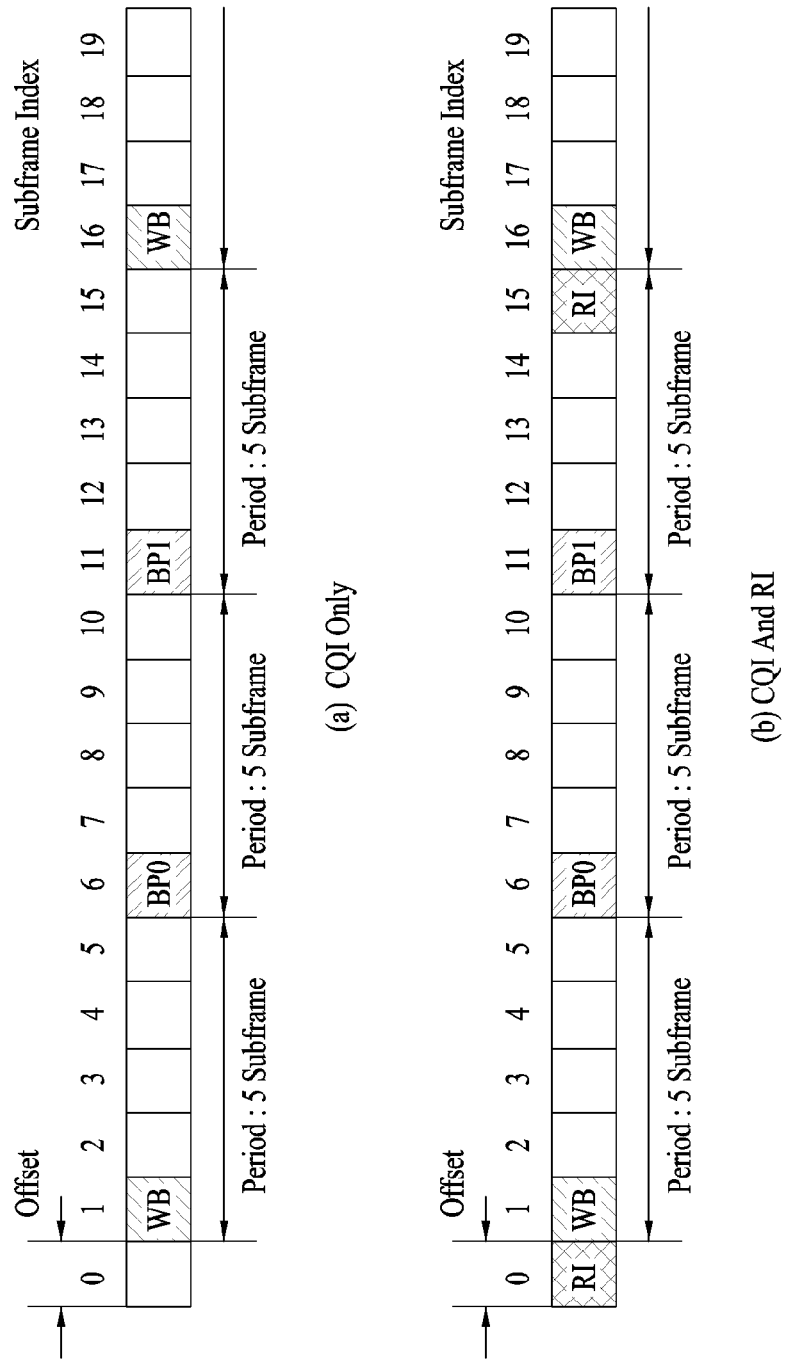

FIG. 10 is a diagram illustrating an exemplary system having a system band with 16 RBs. In this case, it is assumed that the system band includes two bandwidth parts (BPs) BP0 and BP1 which each include two subbands SB0 and SB1 which each include four RBs. This assumption is purely exemplary for explanation. The number BPs and the size of each SB may vary according to the size of the system band. In addition, the number of SBs included in each BP may vary according to the number of RBs, the number of BPs, and the size of SB.

In case of the type for transmission both WB CQI and SB CQI, WB CQI is transmitted in a first CQI transmission subframe, and CQI about an SB having a better channel state from SB0 and SB1, belonging to BP0, and an index (e.g., a subband selection indicator (SSI) corresponding to the corresponding SB are transmitted in a next CQI transmission subframe. Then, CQI about an SB having a better channel state from SB0 and SB1, belonging to BP1, and an index corresponding to the corresponding SB is transmitted in a next transmission subframe. Likewise, after WB CQI is transmitted, CQI information about BPs is sequentially transmitted. CQI information about each BP between two WB CQIs may be sequentially transmitted once to four times. For example, when CQI information about each BP between two WB CQIs is sequentially transmitted once, CQI information may be transmitted in an order of WB CQI⇒BP0 CQI⇒BP1 CQI⇒WB CQI. In addition, when CQI information about each BP between two WB CQIs is sequentially transmitted four times, CQI information may be transmitted in an order of WB CQI⇒BP0 CQI⇒BP1 CQI⇒BP0 CQI⇒BP1 CQI⇒BP0 CQI⇒BP1 CQI⇒BP0 CQI⇒BP1 CQI⇒WB CQI. Information about a number of times that each BP CQI is sequentially transmitted is signaled in an upper layer (e.g., an RRC layer).

FIG. 11(a) is a diagram illustrating an example in which a UE transmits both WB CQI and SB CQI when information indicating {period '5' and offset '1'} is signaled to the UE. Referring to FIG. 11(a), CQI may be transmitted in only a subframe corresponding to signaled period and offset irrespective a type of CQI.

FIG. 11(b) illustrates a case in which RI is additionally transmitted in a case of FIG. 11(a). RI may be signaled from an upper layer (e.g., an RRC layer) via a combination of a multiple of WB CQI transmission period and offset in the corresponding transmission period. Offset of RI is signaled as a relative value based on offset of CQI. For example, when the offset of CQI is '1' and the offset of RI is '0', RI may have the same offset as CQI. The offset of RI is defined as 0 and a negative value. In detail, FIG. 11(b) assumes a case in which a RI transmission period is one time of a WB CQI transmission period and the offset of RI is '−1' in the same environment as in FIG. 11(a). Since the RI transmission period is one time of the WB CQI transmission period, transmission periods of CSI are actually the same. Since the offset of RI is '−1', RI is transmitted based on '−1' (that is, subframe #0) with respect to offset '1' of CQI in FIG. 11(a). When the offset of RI is '0', transmission subframes of WB CQI and RI overlap each other. In this case, WB CQI is dropped and RI is transmitted.

Figure 12:
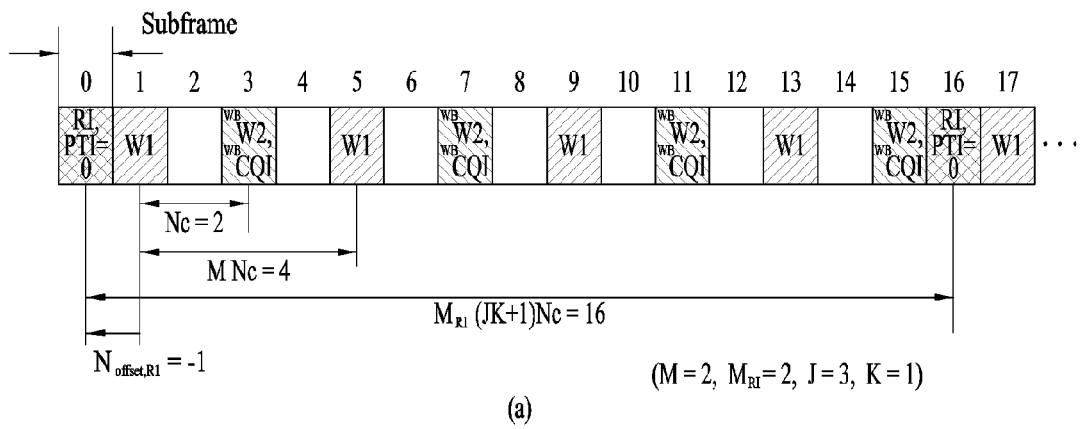
FIGS. 12(a) and 12(b) are diagrams for examples of periodic reportings of channel state information currently discussed in LTE-A system.
Figure 12:
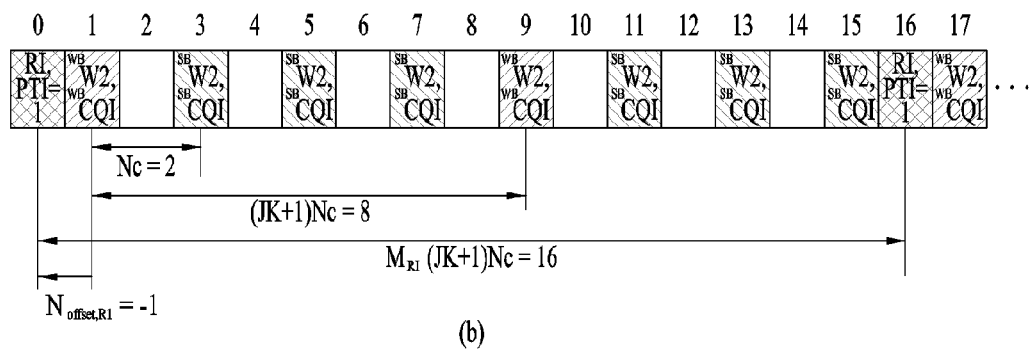
Figure 12:
Figure 12:
Figure 12:
Figure 12:
Figure 12:

FIGS. 12(a) and 12(b) are diagrams for examples of periodic reportings of channel state information currently discussed in LTE-A system. When a base station has 8 transmission antennas, in case of a mode 2-1, a PTI (precoder type indication) parameter corresponding to a 1-bit indicator is configured. In this case, as shown in FIGS. 12(a) and 12(b), it may consider a segmentalized periodic reporting mode of two types according to a PTI value. In the drawing, W1 and W2 indicate a hierarchical codebook mentioned earlier with reference to Equation 8 to 9. A precoding matrix W of a completed form is determined in a manner of combining the W1 and the W2 with each other only when both the W1 and the W2 are determined.

Referring to FIGS. 12(a) and 12(b), in case of periodic reportings, reports of which contents are different from each other corresponding to a report 1, a report 2 and a report 3 are reported according to repetition interval different from each other. The report 1 reports an RI and a 1-bit PTI value. In FIG. 12(a), the report 2 reports WB (wideband) W1 (PTI=0), and the report 3 reports WB W2 and WB CQI (PTI=0). In FIG. 12(b), the report 2 reports WB W2 and WB CQI (PTI=1), and the report 3 reports SB (subband) W2 and SB CQI (PTI=1).

The report 2 and the report 3 are transmitted in a subframe (for clarity, a first subframe set) where a subframe index satisfies (10*nf+floor(ns/2)−Noffset,CQI) mode ($N_C$)=0. The Noffset,CQI corresponds to an offset for transmitting PMI/CQI mentioned earlier in the example of FIG. 9. And, the $N_c$ corresponds to a subframe spacing between the report 2 and the report 3 adjacent to each other. FIGS. 12(a) and 12(b) show examples for cases that the CQI corresponds to 1 and the $N_c$ corresponds to 2 and the first subframe set consists of subframes including an add number index. The of indicates a system frame number (or radio frame index) and the ns indicates a slot index in a radio frame. The floor() indicates a descending function and the A mode B indicates a remainder resulted from dividing A by B.

The report 2 is located on a partial subframe of the first subframe set and the report 3 is located on the remaining subframes. Specifically, the report 2 is located on a subframe where a subframe index satisfies (10*nf+floor(ns/2)−Noffset,CQI) mode (H*$N_C$)=0. Hence, the report 2 is transmitted in every interval of H*$N_c$ and one or more first subframes positioned between adjacent reports 2 are filled with transmission of the report 3. If PTI corresponds to 0, H corresponds to M and the M is determined by higher layer signaling. FIGS. 12(a) and 12(b) show examples for cases that the M corresponds to 2. If the PTI corresponds to 1, the H corresponds to J*K+1. In this case, the K is determined by higher layer signaling and the J corresponds to the number of BP (bandwidth part). FIGS. 12(a) and 12(b) show examples for cases that the J corresponds to 3 and the K corresponds to 1.

The report 1 is transmitted in a subframe where a subframe index satisfies (10*nf+floor(ns/2)−Noffset,CQI−Noffset,RI) mod (MRI*(J*K+1)*Nc)=0 and the MRI is determined by higher layer signaling. The Noffset,RI indicates a relative offset value for the RI. FIGS. 12(a) and 12(b) show examples for cases that the MRI corresponds to 2 and the Noffset,RI corresponds to −1. With the help of the Noffset, RI=−1, a transmission point of the report 1 and a transmission point of the report 2 are not overlapped with each other. When a user equipment calculates RI, W1 and W2 value, those values are calculated in a manner of being associated with each other. For example, the W1 and the W2 are calculated in a manner of being dependent on the RI value and the W2 is calculated in a manner of being dependent on the W1. When the report 1, the report 2 and the report 3 are all reported, a base station is able to know a final W from the W1 and the W2.

Figure 13:
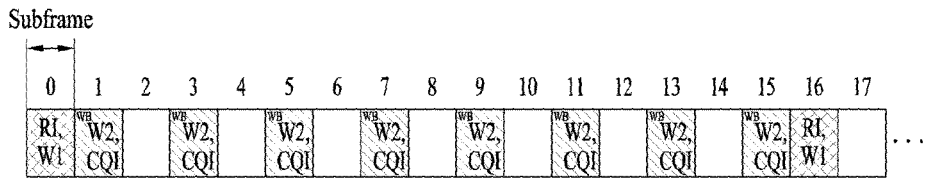
FIG. 13 is a diagram for an example of CSI feedback performed in a submode 1 of a mode 1-1 shown in FIG. 8.
Figure 13:
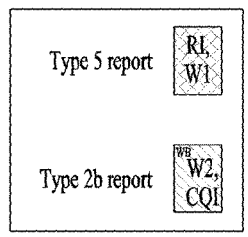

FIG. 13 is a diagram for an example of CSI feedback performed in a submode 1 of a mode 1-1 shown in FIG. 8.

In case of using a dual codebook, a PUCCH feedback mode 1-1 includes a submode 1 and a submode 2. FIG. 13 shows an example for the submode 1. WB (wideband) W2 and WB CQI are configured by an offset of 1 and a period of 2. An RI and W1 are configured by an offset of 0 and a period of 16.

In case of 8Tx codebook, as shown in Table 1 in the following, the RI and the W1 are jointly encoded by 5 bits. In this case, the W1 is subsampled as shown in Table 1. The subsampling is performed to report information with a low coding rate in a manner of reducing a payload size of the RI and the W1. Since the RI corresponds to a value to which the PMI and the CQI refer, it is necessary to encode the RI with a low coding rate in order to make a decoding error not occur on an RI value.

TABLE 1

| hypotheses | RI | values |
|---|---|---|
| 0-7 | 1 | {0, 2, 4, 6, 8, 10, 12, 14} |
| 8-15 | 2 | {0, 2, 4, 6, 8, 10, 12, 14} |
| 16-17 | 3 | {0, 2} |
| 18-19 | 4 | {0, 2} |

TABLE 1-continued

| hypotheses | RI | values |
|---|---|---|
| 20-21 | 5 | {0, 2} |
| 22-23 | 6 | {0, 2} |
| 24-25 | 7 | {0, 2} |
| 26 | 8 | {0} |
| 27-31 | reserved | NA |

Figure 14:
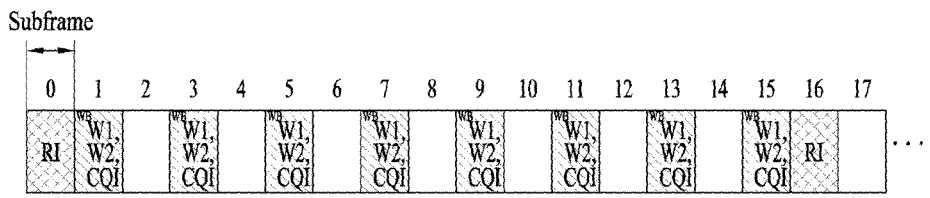
FIG. 14 is a diagram for an example of CSI feedback performed in a submode 2 of a mode 1-1 shown in FIG. 8.
Figure 14:
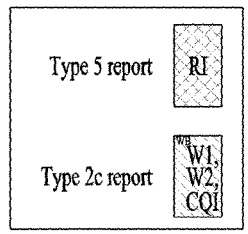

FIG. 14 is a diagram for an example of CSI feedback performed in a submode 2 of a mode 1-1 shown in FIG. 8.

As mentioned in the foregoing description, in case of using a dual codebook structure, a PUCCH feedback mode 1-1 includes a submode 1 and a submode 2. FIG. 14 shows an example for the submode 2. WB W1/W2 and WB CQI are configured by an offset of 1 and a period of 2. An RI is configured by an offset of 0 and a period of 16.

CSI information is reported to a base station via a PUCCH format 2. In particular, the CSI information can be transmitted within 11 bits corresponding to a payload size of the PUCCH format 2. Hence, it is necessary to subsample a codebook in a manner that a payload of a type 2c does not exceed total 11 bits. To this end, W1 and W2 are subsampled as shown in Table 2 in the following in 8Tx codebook and the W1 and the W2 are reported to the type 2c.

TABLE 2

| RI | PMI for W1 #bits | PMI for W1 values | PMI for W2 #bits | PMI for W2 values | total #bits |
|---|---|---|---|---|---|
| 1 | 3 | {0, 2, 4, 6, 8, 10, 12, 14}, | 1 | {0, 2} | 4 |
| 2 | 3 | {0, 2, 4, 6, 8, 10, 12, 14} | 1 | {0, 1} | 4 |
| 3 | 1 | {0, 2} | 3 | {0, 1, 2, 3, 8, 9, 10, 11} | 4 |
| 4 | 1 | {0, 1} | 3 | {0, 1, 2, 3, 4, 5, 6, 7} | 4 |
| 5 | 2 | {0, 1, 2, 3} | 0 | {0} | 2 |
| 6 | 2 | {0, 1, 2, 3} | 0 | {0} | 2 |
| 7 | 2 | {0, 1, 2, 3} | 0 | {0} | 2 |
| 8 | 0 | {0} | 0 | {0} | 0 |

8 Tx W1 for a rank 1 and 8Tx W1 for a rank 2 are identical to each other. And, $i^{th}$ PMI of the W1 and $i+1^{th}$ PMI of the W1 shares two overlapped DFT vectors with each other. It is able to more precisely feedback a channel in a manner of making two DFT vectors to be overlapped with each other between adjacent PMIs. Yet, due to a limited PUCCH resource, as shown in Table 2, PMI of the W1 can be subsampled in a manner of restricting to PMIs of the W1 of even numbers. Although overlapped DFT vectors do not exist between PMIs of even numbers, since a UE is still able to represent total 32 DFT vectors using the subsampled W1, the aforementioned method corresponds to a subsampling method capable of minimizing performance degradation.

Figure 15:
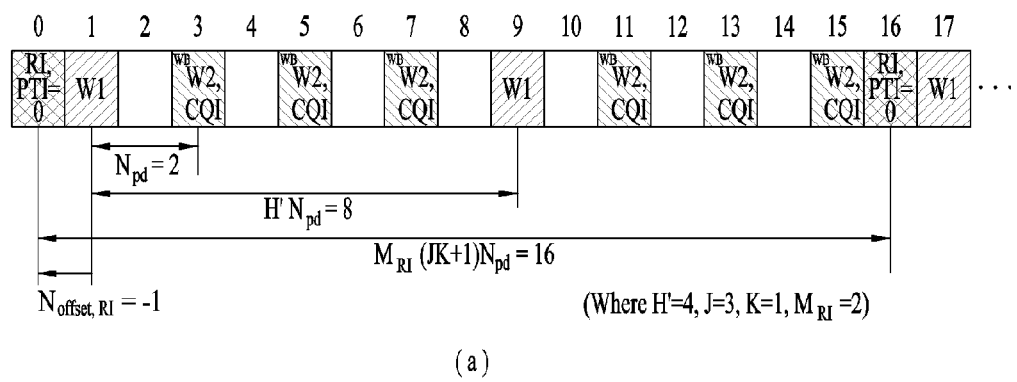
FIG. 15 is a diagram for an example of CSI feedback performed in a mode 2-1 shown in FIG. 8.
Figure 15:
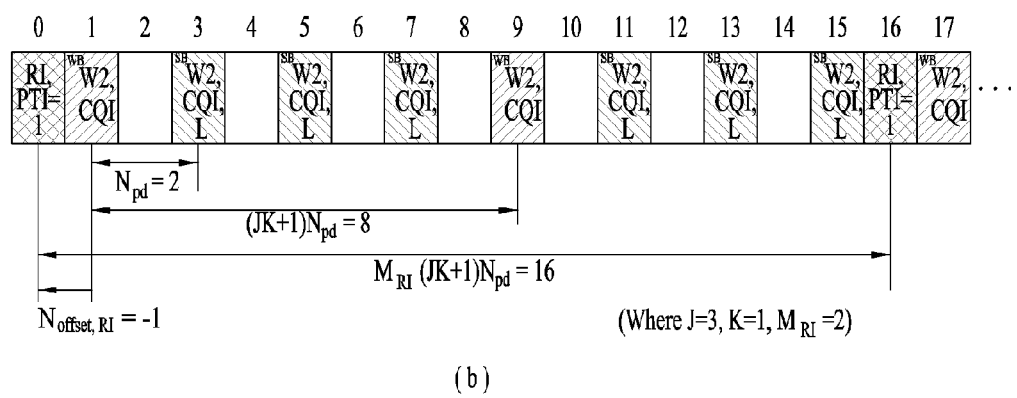

FIG. 15 is a diagram for an example of CSI feedback performed in a mode 2-1 shown in FIG. 8.

In case of using a dual codebook structure, a PUCCH feedback mode 2-1 is defined by two types according to a PTI value. FIG. 15 (a) shows an example when the PTI value corresponds to 0 and FIG. 15 (b) shows an example when the PTI value corresponds to 1. Referring to FIG. 15 (a), a wideband W1 is reported with a period of 8 subframes in a PUCCH feedback resource, which is opened with an offset of 1 and a period of 2, and a wideband W2 and CQI are reported in remaining subframes. An RI and PTI are configured by a period of 16 and an offset of 0. In FIG. 15 (b), if PTI is configured by 1, L bit information indicating a subband W2, a subband CQI and a subband index is reported.

In FIG. 15 (b), 8Tx codebook W2 is subsampled in a type 1a report reporting the L bit information indicating the subband W2, the subband CQI and the subband index subsamples as shown in Table 3 in the following. Through the subsampling, it is able to transmit information within 11 bits corresponding to a size of a payload of a PUCCH format 2. In Table 2, a W2 codeword of a rank 2 reports 0, 2, 4 and 6 only. The values play a role in generating a final codebook in a manner of selecting a single beam from a beam group constructing a W1. For example, when the W1 is configured as Equation in the following, if a codeword 0 of the W2 is selected, a final codebook W is determined as $$W = \begin{bmatrix} w_{11} & w_{11} \\ w_{11} & -w_{11} \end{bmatrix}$$

using $w_{11}$ only. In Equation 11, $w_{11}, w_{12}, w_{13}, w_{14}$ indicates a 4×1 column vector.

$$W1 = \begin{bmatrix} [w_{11} \ w_{12} \ w_{13} \ w_{14}] & 0 \\ 0 & [w_{11} \ w_{12} \ w_{13} \ w_{14}] \end{bmatrix} \quad \text{[Equation 11]}$$

Similarly, if a codeword 2 of the W2 is selected, the final codebook W is determined using $w_{12}$ only. If a codeword 4 of the W2 is selected, the final codebook W is determined using $w_{13}$ only. If a codeword 6 of the W2 is selected, the final codebook W is determined using $w_{14}$ only.

Table 3 in the following shows codebook subsampling in PUCCH mode 2-1. Mod indicates a modular operation.

TABLE 3

Relationship between the second PMI value and codebook index $i_2$

| RI | Value of the second PMI $I_{PMI2}$ | Codebook index $i_2$ |
|---|---|---|
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + (I_{PMI2} \bmod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

A CSI reporting type can be configured by one of various types. For example, a CSI reporting type defined in LTE Rel-10 is described in the following. A type 1 reporting supports CQI feedback for UE selection sub-bands. A type 1a reporting supports narrowband CQI and second PMI feedback. A type 2, a type 2b and a type 2c reporting support wideband CQI and PMI feedback. A type 2a reporting supports wideband PMI feedback. A type 3 reporting supports RI feedback. A type 4 reporting supports wideband CQI. A type 5 reporting supports RI and wideband PMI feedback. A type 6 reporting supports RI and PTI feedback.

4Tx Codebook

A 4Tx codebook can be represented by multiplication of two matrixes as shown in the following.

$$W = W_1 \cdot W_2 \quad \text{[Equation 12]}$$

In this case, an inner precoder $W_1$ and an outer precoder $W_2$ indicate a wideband/long-term channel property and a narrowband/short-term channel property, respectively. The $W_1$ can be configured as follows.

$$W_1 = \begin{bmatrix} X_n & 0 \\ 0 & X_n \end{bmatrix}, n = 0, 1, \ldots, 15 \quad \text{[Equation 13]}$$

In this case, $X_n$ can be configured as follows.

$$X_n = \begin{bmatrix} 1 & 1 & 1 & 1 \\ q_1^n & q_1^{n+8} & q_1^{n+16} & q_1^{n+24} \end{bmatrix} \text{ where } q_1 = e^{j2\pi/32} \quad \text{[Equation 53]}$$

A codebook $W_2$ for rank 1 can be configured as follows.

$$W_{2,n} \in \left\{ \frac{1}{\sqrt{2}}\begin{bmatrix} Y \\ \alpha(i)Y \end{bmatrix}, \frac{1}{\sqrt{2}}\begin{bmatrix} Y \\ j\alpha(i)Y \end{bmatrix}, \right. \quad \text{[Equation 14]}$$
$$\left. \frac{1}{\sqrt{2}}\begin{bmatrix} Y \\ -\alpha(i)Y \end{bmatrix}, \frac{1}{\sqrt{2}}\begin{bmatrix} Y \\ -j\alpha(i)Y \end{bmatrix} \right\}$$
$$Y = e_i \in \{e_1, e_2, e_3, e_4\} \text{ and } \alpha(i) = q_1^{2(i-1)}$$

And, a codebook for rank 2 can be configured as follows.

$$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\} \quad \text{[Equation 15]}$$

$(Y_1, Y_2) = (e_i, e_k) \in \{(e_1, e_1), (e_2, e_2), (e_3, e_3),$
$(e_4, e_4), (e_1, e_2), (e_2, e_3), (e_1, e_4), (e_2, e_4),\}$

In this case, $e_n$ corresponds to a 4-element selecting vector of which an $n^{th}$ element has a value of 1 and all remaining elements have values of 0.

In Equation 14, W2 has a form that two Y vectors are vertically concatenated. In this case, it is able to compensate for phase rotation between a horizontal beam group and a vertical beam group in X-pol antenna in a manner of multiplying a lower Y vector by one selected from the group consisting of 1, −1, j, and −j. In general, 1, −1, j and −j are commonly called a co-phasor factor. Similarly, in Equation 15, it may also consider (1, −1) and (j, −j) as the co-phasor factor.

In the following, an index of W1 is defined as i1. The i1 is identical to a value of an index n of W1 in equation of the aforementioned 4Tx codebook.

And, an index of W2 is defined as shown in Table 4 in the following.

TABLE 4

| Index of W2 | W2 for rank 1 | W2 for rank 2 |
|---|---|---|
| 0 | $\frac{1}{\sqrt{2}}\begin{bmatrix} e_1 \\ q_1^0 e_1 \end{bmatrix}$ | $\frac{1}{2}\begin{bmatrix} e_1 & e_1 \\ e_1 & -e_1 \end{bmatrix}$ |
| 1 | $\frac{1}{\sqrt{2}}\begin{bmatrix} e_1 \\ jq_1^0 e_1 \end{bmatrix}$ | $\frac{1}{2}\begin{bmatrix} e_1 & e_1 \\ je_1 & -je_1 \end{bmatrix}$ |

TABLE 4-continued

| Index of W2 | W2 for rank 1 | W2 for rank 2 |
|---|---|---|
| 2 | $\frac{1}{\sqrt{2}}\begin{bmatrix} e_1 \\ -q_1^0 e_1 \end{bmatrix}$ | $\frac{1}{2}\begin{bmatrix} e_2 & e_2 \\ e_2 & -e_2 \end{bmatrix}$ |
| 3 | $\frac{1}{\sqrt{2}}\begin{bmatrix} e_1 \\ -jq_1^0 e_1 \end{bmatrix}$ | $\frac{1}{2}\begin{bmatrix} e_2 & e_2 \\ je_2 & -je_2 \end{bmatrix}$ |
| 4 | $\frac{1}{\sqrt{2}}\begin{bmatrix} e_2 \\ q_1^2 e_2 \end{bmatrix}$ | $\frac{1}{2}\begin{bmatrix} e_3 & e_3 \\ e_3 & -e_3 \end{bmatrix}$ |
| 5 | $\frac{1}{\sqrt{2}}\begin{bmatrix} e_2 \\ jq_1^2 e_2 \end{bmatrix}$ | $\frac{1}{2}\begin{bmatrix} e_3 & e_3 \\ je_3 & -je_3 \end{bmatrix}$ |
| 6 | $\frac{1}{\sqrt{2}}\begin{bmatrix} e_2 \\ -q_1^2 e_2 \end{bmatrix}$ | $\frac{1}{2}\begin{bmatrix} e_4 & e_4 \\ e_4 & -e_4 \end{bmatrix}$ |
| 7 | $\frac{1}{\sqrt{2}}\begin{bmatrix} e_2 \\ -jq_1^2 e_2 \end{bmatrix}$ | $\frac{1}{2}\begin{bmatrix} e_4 & e_4 \\ je_4 & -je_4 \end{bmatrix}$ |
| 8 | $\frac{1}{\sqrt{2}}\begin{bmatrix} e_3 \\ q_1^4 e_3 \end{bmatrix}$ | $\frac{1}{2}\begin{bmatrix} e_1 & e_2 \\ e_1 & -e_2 \end{bmatrix}$ |
| 9 | $\frac{1}{\sqrt{2}}\begin{bmatrix} e_3 \\ jq_1^4 e_3 \end{bmatrix}$ | $\frac{1}{2}\begin{bmatrix} e_1 & e_2 \\ je_1 & -je_2 \end{bmatrix}$ |
| 10 | $\frac{1}{\sqrt{2}}\begin{bmatrix} e_3 \\ -q_1^4 e_3 \end{bmatrix}$ | $\frac{1}{2}\begin{bmatrix} e_2 & e_3 \\ e_2 & -e_3 \end{bmatrix}$ |
| 11 | $\frac{1}{\sqrt{2}}\begin{bmatrix} e_3 \\ -jq_1^4 e_3 \end{bmatrix}$ | $\frac{1}{2}\begin{bmatrix} e_2 & e_3 \\ je_2 & -je_3 \end{bmatrix}$ |
| 12 | $\frac{1}{\sqrt{2}}\begin{bmatrix} e_4 \\ q_1^6 e_4 \end{bmatrix}$ | $\frac{1}{2}\begin{bmatrix} e_1 & e_4 \\ e_1 & -e_4 \end{bmatrix}$ |
| 13 | $\frac{1}{\sqrt{2}}\begin{bmatrix} e_4 \\ jq_1^6 e_4 \end{bmatrix}$ | $\frac{1}{2}\begin{bmatrix} e_1 & e_4 \\ je_1 & -je_4 \end{bmatrix}$ |
| 14 | $\frac{1}{\sqrt{2}}\begin{bmatrix} e_4 \\ -q_1^6 e_4 \end{bmatrix}$ | $\frac{1}{2}\begin{bmatrix} e_2 & e_4 \\ e_2 & -e_4 \end{bmatrix}$ |
| 15 | $\frac{1}{\sqrt{2}}\begin{bmatrix} e_4 \\ -jq_1^6 e_4 \end{bmatrix}$ | $\frac{1}{2}\begin{bmatrix} e_2 & e_4 \\ je_2 & -je_4 \end{bmatrix}$ |

Embodiment 1

Embodiment 1 according to the present invention relates to a codebook subsampling method in a submode 1 of a PUCCH feedback mode 1-1.

According to the embodiment 1 of the present invention, a scheme of jointly encoding an RI in type 5 reporting and a subsampled W1 with each other can be applied as shown in Table 5 in the following. Since there exist total 17 hypotheses, it is able to represent the hypotheses by 5 bits. An RI value and an index of the W1 according to each hypothesis are shown in Table 5. For example, $0^{th}$ hypotheses means that the RI corresponds to 1 and the W1 index corresponds to 0 and $1^{st}$ hypotheses means that the RI corresponds to 1 and the W1 index corresponds to 1. Rank 3 and 4 do not require any separate signaling for the W1 since the W1 codebook corresponds to an identity matrix.

And, if the RI corresponds to 2 in Table 5 in the following, it can be represented by a value for subtracting 8 from a hypothesis.

TABLE 5

| hypotheses | RI | Index of W1 |
|---|---|---|
| 0-7 | 1 | {0, 1, 2, 3, 4, 5, 6, 7} |
| 8-15 | 2 | {0, 1, 2, 3, 4, 5, 6, 7} |
| 16 | 3 | None (W1 is identity matrix) |
| 17 | 4 | none (W1 is identity matrix) |

Similar to the 8Tx W1 codebook, a codeword of the 4Tx W1 codebook proposed in Equation 13 has values partially overlapped with each other. For example, when a $0^{th}$ W1 codeword and an $8^{th}$ W1 codeword are compared with each other, it is able to know that $X_n$ of each codeword is configured by an identical vector set. For example, the $X_n$ of the $0^{th}$ W1 codeword corresponds to $$X_0 = \begin{bmatrix} 1 & 1 & 1 & 1 \\ q_1^0 & q_1^8 & q_1^{16} & q_1^{24} \end{bmatrix}$$

and the $X_n$ of the $8^{th}$ W1 codeword corresponds to $$X_8 = \begin{bmatrix} 1 & 1 & 1 & 1 \\ q_1^8 & q_1^{16} & q_1^{24} & q_1^0 \end{bmatrix}.$$

Hence, it is able to know that the $X_n$ of each codeword is configured by an identical column vector. This characteristic identically appears on an $i^{th}$ W1 codeword and $i+8^{th}$ W1 codeword. Hence, in case of subsampling a W1 with 3 bits, it is able to efficiently eliminate overlapped W1. The subsampling scheme shown in Table 5 performs subsampling using codewords ranging from 0 to 7 only to make the W1 not to be overlapped with each other in consideration of the characteristic.

It is also able to perform subsampling using codewords ranging from 8 to 15 only instead of the codewords ranging from 0 to 7 in Table 5 with an identical principle. Since the subsampling principle is identical to each other, it is able to obtain identical codebook performance while indexes are different from each other.

As a different scheme, it is able to increase a reception decoding probability in a manner of transmitting a 4-bit payload in a type 5 reporting. In this case, a joint encoding scheme of an RI and a subsampled W1 can be applied as shown in Table 6. Since there exist total 9 hypotheses, it is able to represent the hypotheses by 4 bits. An RI value and an index of the W1 according to each hypothesis are shown in Table 6. For example, $0^{th}$ hypotheses means that the RI corresponds to 1 and the W1 index corresponds to 0 and $1^{st}$ hypotheses means that the RI corresponds to 1 and the W1 index corresponds to 2. Rank 3 and 4 do not require any separate signaling for the W1 since the W1 codebook corresponds to an identity matrix.

TABLE 6

| hypotheses | RI | Index of W1 |
|---|---|---|
| 0-3 | 1 | {0, 2, 4, 6} |
| 4-7 | 2 | {0, 2, 4, 6} |
| 8 | 3 | None (W1 is identity matrix) |
| 9 | 4 | none (W1 is identity matrix) |

A subsampling scheme of Table 6 can be explained by two steps. First of all, similar to Table 5, an overlapped W1 codeword is eliminated. Subsequently, subsampling is performed to make values configuring a second row of $X_n$ among the remaining {0, 1, 2, 3, 4, 5, 6, 7} to be distributed with a same spacing in $(q_1)^k = e^{j2\pi k/32}$, where k=0, 1, 2, ... 3 1. If the subsampling is performed to make the values to be distributed with a same spacing in the $(q_1)^k$, it is able to prevent beams of the W1 from being cornered in specific direction in a codebook space. By doing so, codebook performance degradation caused by the subsampling can be reduced.

It is also able to perform subsampling using codewords {1, 3, 5, 7} only instead of the codewords {0, 2, 4, 6} in Table 6 with an identical principle. Since the subsampling principle is identical to each other, it is able to obtain identical codebook performance while indexes are different from each other.

Meanwhile, in Table 5, a W1 index of rank 1 and a W1 index of rank 2 are identical to each other. Besides, the subsampling scheme of Table 5 and the subsampling scheme of Table 6 can be configured in a manner of being mixed. For example, the W1 of rank 1 uses values of Table 5 and the W1 of rank 2 may use values of Table 6. In this case, since the rank 1 and the rank 2 have 8 hypotheses and 4 hypotheses, respectively, it is able to perform type 5 report transmission using 4 bits.

Embodiment 2

Embodiment 2 according to the present invention relates to a codebook subsampling method in a submode 2 of a PUCCH feedback mode 1-1.

According to the embodiment 2 of the present invention, a subsampling method of W1/W2 in type 2c reporting can be applied as shown in Table 7 in the following. For example, it is able to report one of {0, 1, 2, 3, 4, 5, 6, 7} only by a W1 index and it is able to report one of {0, 2} only with a W2 index in rank 1. Rank 3 and 4 do not require any separate signaling for the W1 since the W1 codebook corresponds to an identity matrix.

TABLE 7

| | PMI for W1 | | PMI for W2 | | total |
|---|---|---|---|---|---|
| RI | #bits | values | #bits | values | #bits |
| 1 | 3 | {0, 1, 2, 3, 4, 5, 6, 7} | 1 | {0, 2} | 4 |
| 2 | 3 | {0, 1, 2, 3, 4, 5, 6, 7} | 1 | {0, 1} | 4 |
| 3 | 0 | None (W1 is identity matrix) | 4 | {0, 1, 2, 3, 4, 5, 6, 7, 8, 9, 10, 11, 12, 13, 14, 15} | 4 |

TABLE 7-continued

| | PMI for W1 | | PMI for W2 | | total |
|---|---|---|---|---|---|
| RI | #bits | values | #bits | values | #bits |
| 4 | 0 | none (W1 is identity matrix) | 4 | {0, 1, 2, 3, 4, 5, 6, 7, 8, 9, 10, 11, 12, 13, 14, 15} | 4 |

In Table 7, the W1 is subsampled using a scheme identical to the scheme of Table 5. A subsampling scheme of W2 is identical to 8Tx. If the W2 is subsampled as shown in Table 7, a selection vector of the W2 is fixed by e1 and it is able to select a co-phasor factor of the W2 only. In this case, although the W1 is configured as {0, 1, 2, 3, 4, 5, 6, 7}, the selection vector of the W2 is fixed by the e1. Hence, a final precoding matrix, which is generated by multiplying the W1 and the W2, uses $0^{th}$ to $7^{th}$ vector only among 32 vectors of 2×32 DFT matrixes, which are oversampled 16 times.

Meanwhile, in case of performing subsampling as shown in Table 7, since a precoding matrix is cornered in specific direction in a codebook space, performance degradation may occur. In order to solve the performance degradation problem, the subsampling can be applied as shown in Table 8 in the following.

TABLE 8

| | PMI for W1 | | PMI for W2 | | total |
|---|---|---|---|---|---|
| RI | #bits | values | #bits | values | #bits |
| 1 | 3 | {0, 4, 8, 12, 16, 20, 24, 28} | 1 | {0, 2} | 4 |
| 2 | 3 | {0, 4, 8, 12, 16, 20, 24, 28} | 1 | {0, 1} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

As a further different scheme, a subsampling scheme of W1/W2 can be applied as shown in Table 9 in a type 2c reporting. In Table 7 and 8, although the W1 and the W2 are represented by 3 bits and 1 bit, respectively, the W1 and the W2 are represented by 2 bits and 2 bits, respectively in Table 9. Hence, it is able to secure freedom capable of selecting not only a co-phasor factor but also a selection vector in the W2. In particular, it is able to select not only e1 but also e3 as a selection vector. A vector of the W1 selected as the e1 and a vector of the W1 selected as the e3 have a characteristic orthogonal to each other. If frequency selectivity is big, it is able to more precisely make a feedback on channel direction in a manner of making the W2 corresponding to subband information select the e1 or the e3.

TABLE 9

| | PMI for W1 | | PMI for W2 | | total |
|---|---|---|---|---|---|
| RI | #bits | values | #bits | values | #bits |
| 1 | 2 | {0, 2, 4, 6} | 2 | {0, 2, 8, 10} | 4 |
| 2 | 2 | {0, 2, 4, 6} | 2 | {0, 1, 4, 5} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

In Table 9, the W1 is subsampled using a method identical to Table 6. If the W2 is subsampled as shown in Table 9, it may be able to select e1 and e3 using a selection vector of the W2. In this case, although the W1 is configured as {0, 2, 4, 6}, the selection vector of the W2 can select the e1 and the e3 only rather than e1, e2, e3 and e4. Hence, a final precoding matrix, which is generated by multiplying the W1 and the W2, uses unevenly distributed vectors only among 32 vectors of 2×32 DFT matrixes oversampled 16 times. In particular, the final precoding matrix uses {$0^{th}$, $2^{nd}$, $4^{th}$, $6^{th}$, $16^{th}$, $18^{th}$, $20^{th}$, $22^{nd}$} DFT vectors only.

Meanwhile, in case of performing subsampling as shown in Table 9, since a precoding matrix is cornered in specific direction in a codebook space, performance degradation may occur. In order to solve the performance degradation problem, the subsampling can be performed as shown in Table 10 in the following. In case of Table 10, a final precoding matrix, which is generated by multiplying the W1 and the W2, uses uniformly distributed {$0^{th}$, $4^{th}$, $8^{th}$, $12^{th}$, $16^{th}$, $20^{th}$, $24^{th}$, $28^{th}$} DFT vectors among 32 vectors of 2×32 DFT matrixes oversampled 16 times.

TABLE 10

| | PMI for W1 | | PMI for W2 | | total |
|---|---|---|---|---|---|
| RI | #bits | values | #bits | values | #bits |
| 1 | 2 | {0, 4, 8, 12} | 2 | {0, 2, 8, 10} | 4 |
| 2 | 2 | {0, 4, 8, 12} | 2 | {0, 1, 4, 5} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

In Table 10, when a rank corresponds to 1 and 2, it is able to induce a codebook index of the W1 corresponding to {0, 4, 8 12} in a manner of multiplying a first PMI index $I_{PMI1}$, which has a value among 0 to 3, by 4.

And, in Table 10, when a rank correspond to 1, it is able to induce a codebook index of the W2 corresponding to {0, 2, 8, 10} in a manner of applying a second PMI index $I_{PMI2}$, which has a value among 0 to 3, to Equation described in the following.

$$2I_{PMI2}+4\cdot\lfloor I_{PMI2}/2 \rfloor \quad \text{[Equation 15]}$$

And, in Table 10, when a rank correspond to 2, it is able to induce a codebook index of the W2 corresponding to {0, 1, 4, 5} in a manner of applying the second PMI index $I_{PMI2}$, which has a value among 0 to 3, to Equation described in the following.

$$I_{PMI2}+2\cdot\lfloor I_{PMI2}/2 \rfloor \quad \text{[Equation 16]}$$

Embodiment 3

Embodiment 3 according to the present invention relates to a codebook subsampling method in a submode 2 of a PUCCH feedback mode 1-1.

In Table 11 in the following, W1 is subsampled by a principle identical to a principle of Table 5. A subsampling scheme of W2 varies according to PMI of the W1.

First of all, a case of a rank 1 is explained in the following. If the PMI of the W1 corresponds to an even number, it is able to select a first and a third vector from a beam group constructing the W1 in a manner of subsampling the W2 by 0 and 8. On the contrary, if PMI of the W1 corresponds to an odd number, it is able to select a second and a fourth vector from the beam group constructing the W1 in a manner of subsampling the W2 by 4 and 12. In this case, a co-phasor factor is fixed by 1.

A beam index can be represented as Table 12 in the following. A single beam group is determined according to W1 PMI. A single beam group consists of 4 vectors among vectors of 2×32 DFT matrixes. The vector indexes of 2×32 DFT matrixes configuring the beam group can be represented as Table 12.

Among the vector indexes shown in Table 12, indexes represented by a bold face indicate values capable of being fed back by a subsampling scheme. A UE can feedback a precoder configured by one selected from DFT vectors consisting of 0, 2, 4, 6, 8, 9, 11, 13, 15, 16, 18, 20, 22, 24, 25, 27, 29, $31^{st}$ DFT vector in 2×32 DFT matrixes to a base station using the subsampling scheme. According to the subsampling scheme, although 32 DFT vectors are not separated from each other with an exactly same space, total 32 DFT vectors can be subsampled with a relatively same space in a manner of differently selecting 1 bit assigned to W2 feedback according to W1 PMI. As a result, it is able to prevent beams of the W1 from being cornered in specific direction in a codebook space. By doing so, codebook performance degradation caused by the subsampling can be reduced.

TABLE 11

| | PMI for W1 | | PMI for W2 | | total |
|---|---|---|---|---|---|
| RI | #bits | values | #bits | values | #bits |
| 1 | 3 | {0, 1, 2, 3, 4, 5, 6, 7} | 1 | if PMI for W1 is even, {0, 8}, otherwise, {4, 12} | 4 |
| 2 | 3 | {0, 1, 2, 3, 4, 5, 6, 7} | 1 | if PMI for W1 is even, {0, 4} otherwise PMI for W1 is odd, {2, 6} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

TABLE 12

| | W1 PMI | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| DFT vector index | 0 | 1 | 2 | 3 | 4 | 5 | 6 | 7 | 8 | 9 | 10 | 11 | 12 | 13 | 14 | 15 |
| | 16 | 17 | 18 | 19 | 20 | 21 | 22 | 23 | 24 | 25 | 26 | 27 | 28 | 29 | 30 | 31 |
| | 24 | 25 | 26 | 27 | 28 | 29 | 30 | 31 | 0 | 1 | 2 | 3 | 4 | 5 | 6 | 7 |

In Table 11, a value of a co-phasor is fixed. Yet, when a characteristic of X-pol antenna is considered, making a feedback on the co-phasor may give important influence on performance. Hence, in case of a rank 1 having a room for a payload, it may be able to configure Table 13 in a manner of additionally adding a co-phasor {1, −1} to Table 11. In LTE, periodic CSI feedback is transmitted via a PUCCH format 2 including a payload size of maximum 11 bits. In case of the rank 1, since CQI, which is fed back together with PMI, corresponds to 4 bits, it is able to transmit maximum 7 bits for the PMI. In addition, in case of transmitting 6 bits in the rank 1, it is able to use all of co-phasors {1, −1, j, −j}. In this case, PMI of W2 can be defined as follows. If PMI for W1 corresponds to an even number, the PMI of the W2 can be defined as {0, 1, 2, 3, 8, 9, 10, 11}. Otherwise, the PMI of the W2 can be defined as {4, 5, 6, 7, 12, 13, 14, 15}.

TABLE 13

| | PMI for W1 | | PMI for W2 | | total |
|---|---|---|---|---|---|
| RI | #bits | values | #bits | values | #bits |
| 1 | 3 | {0, 1, 2, 3, 4, 5, 6, 7} | 2 | if PMI for W1 is even, {0, 2, 8, 10}, otherwise, {4, 6, 12, 14} | 5 |
| 2 | 3 | {0, 1, 2, 3, 4, 5, 6, 7} | 1 | if PMI for W1 is even, {0, 4} otherwise PMI for W1 is odd, {2, 6} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

As mentioned in the foregoing description, in case of performing the subsampling scheme mentioned earlier in Table 9, since a subsampled precoding matrix is cornered in specific direction in a codebook space, performance may be degraded. In order to solve the problem, it may apply a subsampling scheme shown in Table 14.

According to Table 9, selection vector of W2 corresponds to e1, e2, e3, e4 in a rank 1 and corresponds to (e1, e1), (e2, e2), (e3, e3), (e4, e4) in a rank 2. A co-phasor is fixed by 1. As a result, it is able to make a feedback on precoders consisting of indexes represented by a bold face in Table 15. In particular, a UE can make a feedback on a precoder using a DFT vector of {0, 2, 4, 6, 8, 10, 12, 14, 16, 18, 20, 22, 24, 26, 28, 30}. It is able to prevent beams from being cornered in specific direction in a codebook space by subsampling DFT matrixes with a same space. By doing so, codebook performance degradation caused by the subsampling can be reduced.

It is able to additionally add a co-phasor subsampling to Table 14 in the following only when a rank corresponds to 1. If co-phasors {1, −1} are added, W2 PMI is changed to {0, 2, 4, 6, 8, 10, 12, 14}. If co-phasors {1, −1, j, −j} are added, the W2 PMI is changed to {0, 1, 2, 3, 4, 5, 6, 7, 8, 9, 10, 11, 12, 13, 14, 15}.

TABLE 14

| | PMI for W1 | | PMI for W2 | | total |
|---|---|---|---|---|---|
| RI | #bits | values | #bits | values | #bits |
| 1 | 2 | {0, 2, 4, 6} | 2 | {0, 4, 8, 12} | 4 |
| 2 | 2 | {0, 2, 4, 6} | 2 | {0, 2, 4, 6} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

TABLE 15

| Scheme | W1 PMI | | | | | | | | | | | | | | | |
|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 |
| DFT vector index | 0 | 1 | 2 | 3 | 4 | 5 | 6 | 7 | 8 | 9 | 10 | 11 | 12 | 13 | 14 | 15 |
|  | 8 | 9 | 10 | 11 | 12 | 13 | 14 | 15 | 16 | 17 | 18 | 19 | 20 | 21 | 22 | 23 |
|  | 16 | 17 | 18 | 19 | 20 | 21 | 22 | 23 | 24 | 25 | 26 | 27 | 28 | 29 | 30 | 31 |
|  | 24 | 25 | 26 | 27 | 28 | 29 | 30 | 31 | 0 | 1 | 2 | 3 | 4 | 5 | 6 | 7 |

Referring to Table 14, since 2 bits given to W2 are all used for beam selection, it is unable to perform co-phasor feedback. Yet, since the co-phasor may give important influence on codebook performance in X-pol antenna, as shown in Table 16, it may use a method shown in Table 16 that one bit is used for beam selection and another bit is used for the co-phasor feedback. According to the method, 1 and −1 are subsampled for a co-phasor. If W1 PMI corresponds to 0 or 4, beam selection is set to e1 and e3. Otherwise, beam selection is set to e2 and e4.

DFT vector indexes capable of being selected by the subsampling scheme shown in Table 16 can be configured by indexes represented by a bold face in Table 17. It is able to prevent beams from being cornered in specific direction in a codebook space by subsampling total 32 DFT vectors with a relatively same space. By doing so, codebook performance degradation caused by the subsampling can be reduced.

TABLE 16

|  | PMI for W1 | | PMI for W2 | | total |
|---|---|---|---|---|---|
| RI | #bits | values | #bits | values | #bits |
| 1 | 2 | {0, 2, 4, 6} | 2 | If PMI for W1 is 0 or 4, {0, 2, 8, 10} Otherwise, {4, 6, 12, 14} | 4 |
| 2 | 2 | {0, 2, 4, 6} | 2 | {0, 2, 4, 6} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

TABLE 17

| Scheme | W1 PMI | | | | | | | | | | | | | | | |
|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 |
| DFT vector index | 0 | 1 | 2 | 3 | 4 | 5 | 6 | 7 | 8 | 9 | 10 | 11 | 12 | 13 | 14 | 15 |
|  | 8 | 9 | 10 | 11 | 12 | 13 | 14 | 15 | 16 | 17 | 18 | 19 | 20 | 21 | 22 | 23 |
|  | 16 | 17 | 18 | 19 | 20 | 21 | 22 | 23 | 24 | 25 | 26 | 27 | 28 | 29 | 30 | 31 |
|  | 24 | 25 | 26 | 27 | 28 | 29 | 30 | 31 | 0 | 1 | 2 | 3 | 4 | 5 | 6 | 7 |

As a further different subsampling scheme, it may apply Table 18. In Table 18, W1 is restricted to an even number index and W2 is differently subsampled according to the index of the W1. If W2 subsampling is configured according to the aforementioned scheme, it may be able to configure a precoder using all even number DFT vectors among total 32 DFT vectors. Indexes of DFT vectors capable of being subsampled via Table 18 are shown in Table 19.

It is able to additionally add a co-phasor subsampling to Table 14 only when a rank corresponds to 1. In case of adding co-phasors 11, −11, W2 PMI is changed to {0, 2, 4, 6}. In case of adding co-phasors {1, −1, j, −j}, the W2 PMI is changed to {4, 5, 6, 7, 8, 9, 10, 11}.

TABLE 18

|  | PMI for W1 | | PMI for W2 | | total |
|---|---|---|---|---|---|
| RI | #bits | values | #bits | values | #bits |
| 1 | 3 | {0, 2, 4, 6, 8, 10, 12, 14} | 1 | If PMI for W1 is less than 8, {0, 4} Otherwise, {4, 8} | 4 |
| 2 | 3 | {0, 2, 4, 6, 8, 10, 12, 14} | 1 | If PMI for W1 is less than 8, {0, 2} Otherwise, {2, 4} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

TABLE 19

| Scheme | W1 PMI | | | | | | | | | | | | | | | |
|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 |
| DFT vector index | 0 | 1 | 2 | 3 | 4 | 5 | 6 | 7 | 8 | 9 | 10 | 11 | 12 | 13 | 14 | 15 |
|  | 8 | 9 | 10 | 11 | 12 | 13 | 14 | 15 | 16 | 17 | 18 | 19 | 20 | 21 | 22 | 23 |
|  | 16 | 17 | 18 | 19 | 20 | 21 | 22 | 23 | 24 | 25 | 26 | 27 | 28 | 29 | 30 | 31 |
|  | 24 | 25 | 26 | 27 | 28 | 29 | 30 | 31 | 0 | 1 | 2 | 3 | 4 | 5 | 6 | 7 |

As a further different subsampling scheme, it may apply Table 20. W1 consists of even number indexes only and W2 is differently determined according to W1 PMI. As a result, a selectable DFT vector can be configured as indexes represented by a bold face in Table 21. For example, if subsampling is performed on {0, 10, 20, 30, 16, 26, 4, 14} vectors, it may be able to subsample total 32 DFT vectors with a relatively same space. As a result, it is able to prevent beams from being cornered in specific direction in a codebook space. By doing so, codebook performance degradation caused by the subsampling can be reduced.

As shown in Table 20, it is able to add a co-phasor subsampling only when a rank corresponds to 1.

In case of adding co-phasors {1, −1}, W2 PMI can be configured as follows. If PMI for W1 corresponds to 0, PMI for W2 may become 0 or 2. If PMI for W1 corresponds to 2, PMI for W2 may become 4 or 6. If PMI for W1 corresponds to 4, PMI for W2 may become 8 or 10. If PMI for W1 corresponds to 6, PMI for W2 may become 12 or 14. If PMI for W1 corresponds to 8, PMI for W2 may become 4 or 6. If PMI for W1 corresponds to 10, PMI for W2 may become 8 or 10. If PMI for W1 corresponds to 12, PMI for W2 may become 12 or 14. If PMI for W1 corresponds to 14, PMI for W2 may become 0 or 2.

In case of adding co-phasors {1, −1, j, −j}, W2 PMI can be configured as follows. If PMI for W1 corresponds to 0, PMI for W2 may become 0, 1, 2 or 3. If PMI for W1 corresponds to 2, PMI for W2 may become 4, 5, 6 or 7. If PMI for W1 corresponds to 4, PMI for W2 may become 8, 9, 10 or 11. If PMI for W1 corresponds to 6, PMI for W2 may become 12, 13, 14 or 15. If PMI for W1 corresponds to 8, PMI for W2 may become 4, 5, 6 or 7. If PMI for W1 corresponds to 10, PMI for W2 may become 8, 9, 10 or 11. If PMI for W1 corresponds to 12, PMI for W2 may become 12, 13, 14 or 15. If PMI for W1 corresponds to 14, PMI for W2 may become 0, 1, 2 or 3.

TABLE 20

| | PMI for W1 | | PMI for W2 | | total |
|---|---|---|---|---|---|
| RI | #bits | values | #bits | values | #bits |
| 1 | 3 | {0, 2, 4, 6, 8, 10, 12, 14} | 1 | If PMI for W1 is 0, then 0<br>If PMI for W1 is 2, then 4<br>If PMI for W1 is 4, then 8<br>If PMI for W1 is 6, then 12<br>If PMI for W1 is 8, then 4<br>If PMI for W1 is 10, then 8<br>If PMI for W1 is 12, then 12<br>If PMI for W1 is 14, then 0 | 4 |
| 2 | 3 | {0, 2, 4, 6, 8, 10, 12, 14} | 1 | If PMI for W1 is 0, then 0<br>If PMI for W1 is 2, then 2<br>If PMI for W1 is 4, then 4<br>If PMI for W1 is 6, then 6<br>If PMI for W1 is 8, then 2<br>If PMI for W1 is 10, then 4<br>If PMI for W1 is 12, then 6<br>If PMI for W1 is 14, then 0 | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

TABLE 21

| | W1 PMI | | | | | | | | | | | | | | | |
|---|---|---|---|---|---|---|---|---|---|---|---|---|---|---|---|---|
| Scheme | 0 | 1 | 2 | 3 | 4 | 5 | 6 | 7 | 8 | 9 | 10 | 11 | 12 | 13 | 14 | 15 |
| DFT vector index | 0<br>8<br>16<br>24 | 1<br>9<br>17<br>25 | 2<br>10<br>18<br>26 | 3<br>11<br>19<br>27 | 4<br>12<br>20<br>28 | 5<br>13<br>21<br>29 | 6<br>14<br>22<br>30 | 7<br>15<br>23<br>31 | 8<br>16<br>24<br>0 | 9<br>17<br>25<br>1 | 10<br>18<br>26<br>2 | 11<br>19<br>27<br>3 | 12<br>20<br>28<br>4 | 13<br>21<br>29<br>5 | 14<br>22<br>30<br>6 | 15<br>23<br>31<br>7 |

Referring to Table 20, all W2 PMIs are different from each other according to each W1 PMI. For simpler implementation, Table 20 can be modified into Table 22. As a result, it is able to check selectable DFT vectors in Table 23. In Table 20, it is able to add a co-phasor only when a rank corresponds to 1.

In case of adding co-phasors {1, −1}, W2 PMI can be configured as follows. If PMI for W1 corresponds to 0/8, PMI for W2 may become 0 or 2. If PMI for W1 corresponds to 2/10, PMI for W2 may become 4 or 6. If PMI for W1 corresponds to 4/12, PMI for W2 may become 8 or 10. If PMI for W1 corresponds to 6/14, PMI for W2 may become 12 or 14.

In case of adding co-phasors {1, −1, j, −j}, W2 PMI can be configured as follows. If PMI for W1 corresponds to 0/8, PMI for W2 may become 0, 1, 2 or 3. If PMI for W1 corresponds to 2/10, PMI for W2 may become 4, 5, 6 or 7. If PMI for W1 corresponds to 4/12, PMI for W2 may become 8, 9, 10 or 11. If PMI for W1 corresponds to 6/14, PMI for W2 may become 12, 13, 14 or 15.

TABLE 22

| | PMI for W1 | | PMI for W2 | | total |
|---|---|---|---|---|---|
| RI | #bits | values | #bits | values | #bits |
| 1 | 3 | {0, 2, 4, 6, 8, 10, 12, 14} | 1 | If PMI for W1 is 0/8, then 0<br>If PMI for W1 is 2/10, then 4<br>If PMI for W1 is 4/12, then 8<br>If PMI for W1 is 6/14, then 12 | 4 |
| 2 | 3 | {0, 2, 4, 6, 8, 10, 12, 14} | 1 | If PMI for W1 is 0/8, then 0<br>If PMI for W1 is 2/10, then 2<br>If PMI for W1 is 4/12, then 4<br>If PMI for W1 is 6/14, then 6 | 4 |

TABLE 22-continued

| | PMI for W1 | | PMI for W2 | | total |
|---|---|---|---|---|---|
| RI | #bits | values | #bits | values | #bits |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

TABLE 23

| | W1 PMI | | | | | | | | | | | | | | | |
|---|---|---|---|---|---|---|---|---|---|---|---|---|---|---|---|---|
| Scheme | 0 | 1 | 2 | 3 | 4 | 5 | 6 | 7 | 8 | 9 | 10 | 11 | 12 | 13 | 14 | 15 |
| DFT vector index | 0 | 1 | 2 | 3 | 4 | 5 | 6 | 7 | 8 | 9 | 10 | 11 | 12 | 13 | 14 | 15 |
| | 8 | 9 | 10 | 11 | 12 | 13 | 14 | 15 | 16 | 17 | 18 | 19 | 20 | 21 | 22 | 23 |
| | 16 | 17 | 18 | 19 | 20 | 21 | 22 | 23 | 24 | 25 | 26 | 27 | 28 | 29 | 30 | 31 |
| | 24 | 25 | 26 | 27 | 28 | 29 | 30 | 31 | 0 | 1 | 2 | 3 | 4 | 5 | 6 | 7 |

In the aforementioned method of Table 10, W2 has a payload size of 2 bits. Yet, in order to subsample more codewords, it is able to make feedback on all W2 codewords without subsampling the W2. An example of method is shown in Table 24. As a result, it is able to select co-phasors {1, −1, j, −j} via the W2 and select e1, e2, e3 and e4 selection vector.

When Table 10 and Table 24 are compared with each other, it is able to see that decoding performance is degraded according to the increase of a CSI payload size. Yet, it is able to perform accurate CSI feedback by transmitting more codewords. If a payload size of a rank 1 is adjusted into 5 bits in consideration of decoding performance degradation, a value of the W2 can be restricted to even numbers among numbers ranging from 0 to 15. As a result, a co-phasor can select either 1 or −1 and it may be able to select e1, e2, e3 and e4 selection vector.

And, in order to more diversify a co-phasor, a W2 index can be restricted to an even number or an add number according to a W1 value instead of being restricted to an even number. For example, if W1 corresponds to 0/8, W2 may have an even number. If W1 corresponds to 4/12, W2 may have an odd number. As a result, if W1 corresponds to 0/8, a co-phasor can select either 1 or −1. If W1 corresponds to 4/12, a co-phasor can select either j or −j.

TABLE 24

| | PMI for W1 | | PMI for W2 | | total |
|---|---|---|---|---|---|
| RI | #bits | values | #bits | values | #bits |
| 1 | 2 | {0, 4, 8, 12} | 4 | 0 to 15 | 6 |
| 2 | 2 | {0, 4, 8, 12} | 2 | {0, 1, 4, 5} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

As mentioned in the foregoing description, a method of performing subsampling in a manner of differently operating a co-phasor set according to a W1 value may be non-limited by the method of Table 24. The method can be applied to all codebook subsampling methods of the present invention.

In a subsampling scheme of many embodiments according to the present invention, when 1-bit payload is used for a W2 co-phasor, 1 or −1 is selected irrespective of a W1 index. Yet, if a scheme described in the following is applied, it is able to feedback a different co-phasor value rather than 1 or −1, although 1-bit payload is used for the W2 co-phasor.

For example, as a result of subsampling W1, it may assume that a UE makes a feedback on a value selected from W1 PMI {i, i+p, i+2p, i+3p, ... , i+(n−1)p, i+np} to a base station. In this case, co-phasor subsampling of W2 is configured as 1, −1 when W1 corresponds to i, i+2p, i+4p, i+6p, ... i+np and is configured as j, −j for the remaining W1. In particular, when W1 PMIs capable of being fed back are arranged in ascending order, a co-phasor of W2 is restricted to 1, −1 in odd number W1 PMIs. The co-phasor of W2 is restricted to j, −j in the remaining W1 PMIs. As a result, it is able to make a feedback on three or more co-phasor values using 1-bit payload.

For example, it is able to perform such a subsampling scheme as Table 23-1 in the following. In Table 10 and Table 20-1, W1 is identical to each other but W2 is different from each other. In Table 23-1, although a rank 1 selection vector is still {e1, e3}, if W1 corresponds to 0 or 8, a co-phasor corresponds to {1, −1}. Otherwise, the co-phasor corresponds to {j, −j}. Hence, it may be able to generate 4 DFT codewords. In rank 2, a selection vector corresponds to {(e1, e1), (e3, e3), (e2, e3), (e1, e4)} and a subsampled co-phasor is determined according to W1 PMI. If the W1 PMI is less than 8, a co-phasor corresponds to (1, −1). Otherwise, the co-phasor corresponds to (j, −j).

TABLE 23-1

| | PMI for W1 | | PMI for W2 | | total |
|---|---|---|---|---|---|
| RI | #bits | values | #bits | values | #bits |
| 1 | 2 | {0, 4, 8, 12} | 4 | If W1 PMI = 0, 8, then {0, 2, 8, 10} Otherwise, {1, 3 9, 11} If W1 PMI = 0, 8, then {0, 4, 10, 12} | 6 |
| 2 | 2 | {0, 4, 8, 12} | 2 | Otherwise, {1, 5, 11, 13} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

Similarly, it is able to perform such a subsampling scheme as Table 23-2 in the following. In Table 10 and Table 23-2, W1 is identical to each other but W2 is different from each other. In Table 23-2, although a rank 1 selection vector is still {e1, e3}, if W1 corresponds to 0 or 8, a co-phasor corresponds to {1, −1}. Otherwise, the co-phasor corresponds to {j, −j}. Hence, it may be able to generate 4 DFT codewords. In rank 2, a selection vector still corresponds to {(e1, e1), (e3, e3), (e2, e3), (e1, e4)} and a subsampled co-phasor is determined according to W1 PMI. If the W1 PMI is less than 8, a co-phasor corresponds to (1, −1). Otherwise, the co-phasor corresponds to (j, −j).

TABLE 23-2

| RI | PMI for $W_1$ | | PMI for $W_2$ | | total |
|---|---|---|---|---|---|
| | #bits | values | #bits | values | #bits |
| 1 | 2 | {0, 4, 8, 12} | 2 | If W1 PMI = 0 or 8, {0, 2, 8, 10} Otherwise, {1, 3, 9, 11} | 4 |
| 2 | 2 | {0, 4, 8, 12} | 2 | If W1 PMI = 0 or 8, {0, 1, 4, 5} Otherwise, {2, 3, 6, 7} | 4 |
| 3 | 0 | None ($W_1$ is identity matrix) | 4 | {0, 1, 2, 3, 4, 5, 6, 7, 8, 9, 10, 11, 12, 13, 14, 15} | 4 |
| 4 | 0 | None ($W_1$ is identity matrix) | 4 | {0, 1, 2, 3, 4, 5, 6, 7, 8, 9, 10, 11, 12, 13, 14, 15} | 4 |

Similarly, it is able to perform such a subsampling scheme as Table 23-3 in the following. Table 23-2 is similar to Table 23-1. There is a difference in that W2 is fixed by {0, 4, 10, 12} in rank 2.

TABLE 23-3

| RI | PMI for W1 | | PMI for W2 | | total |
|---|---|---|---|---|---|
| | #bits | values | #bits | values | #bits |
| 1 | 2 | {0, 4, 8, 12} | 4 | If W1 PMI = 0, 8, then {0, 2, 8, 10} Otherwise, {1, 3 9, 11} | 6 |
| 2 | 2 | {0, 4, 8, 12} | 2 | {0, 4, 10, 12} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

In Table 10 and Table 24, co-phasors (1, −1) and (j, −j) are used as W2 subsampling of rank 2. Yet, efficiency of the phase information tends to be reduced as a rank is getting bigger. Hence, it may be able to use more selection vectors in a manner of fixing the co-phasor by (1, −1). For example, the W2 subsampling of rank 2 can be configured by {0, 2, 4, 6}, {0, 4, 8, 10} or {0, 4, 10, 12}. In additional, if a co-phasor is diversified in a manner of fixing the co-phasor by (1, −1) when W1 corresponds to 0/8 and fixing the co-phasor by (j, −j) when W1 corresponds to 4/12 without fixing the co-phasor by (1, −1), it is useful for performance.

As a further different subsampling scheme, it may apply a method of Table 25. If W1 has a 1-bit payload size, it is efficient to perform subsampling on 0 and 4. If W1 corresponds to 0 or 4, selectable DFT vectors correspond to 0, 4, 8, 12, 16, 20, 24 and 28$^{th}$ vector separated from each other as much as 4 spaces among total 32 DFT vectors. If a codeword is generated with a same space DFT, it is able to prevent beams from being cornered in specific direction in a codebook space. By doing so, it is able to reduce codebook performance degradation caused by the subsampling. In case of rank 2, in order to generate a codeword identical to a codeword subsampled in Table 2, W2 is configured by {0, 1, 4, 5} in Table 25. In case of rank 1, all W2 codewords are used.

TABLE 25

| RI | PMI for W1 | | PMI for W2 | | total |
|---|---|---|---|---|---|
| | #bits | values | #bits | values | #bits |
| 1 | 1 | {0, 4} | 4 | 0 to 16 | 5 |
| 2 | 2 | {0, 4} | 2 | {0, 1, 4, 5} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

As a further different subsampling scheme, it may apply a method of Table 26. According to the subsampling scheme of Table 26, W1 is configured by a value identical to Table 11 and W2 subsamples a different selection vector according to a W1 value. A co-phasor of the W2 is configured by 1/−1. In Table 27, indexes of DFT vectors capable of being selected by the subsampling scheme of Table 26 are represented by a bold face. If a codeword is generated by performing subsampling on total 32 DFT vectors with a relatively same space, it is able to prevent beams from being cornered in specific direction in a codebook space. By doing so, it is able to reduce codebook performance degradation caused by the subsampling.

TABLE 26

| RI | PMI for W1 | | PMI for W2 | | total |
|---|---|---|---|---|---|
| | #bits | values | #bits | values | #bits |
| 1 | 3 | {0, 1, 2, 3, 4, 5, 6, 7} | 1 | If PMI for W1 is 0/4, then 0 or 2 If PMI for W1 is 1/5, then 4 of 6 If PMI for W1 is 2/6, then 8 or 10 If PMI for W1 is 3/7, then 12 or 14 | 4 |
| 2 | 3 | {0, 1, 2, 3, 4, 5, 6, 7} | 1 | {0, 4} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

TABLE 27

| | W1 PMI | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| DFT vector index | 0 | 1 | 2 | 3 | 4 | 5 | 6 | 7 | 8 | 9 | 10 | 11 | 12 | 13 | 14 | 15 |
| | 8 | 9 | 10 | 11 | 12 | 13 | 14 | 15 | 16 | 17 | 18 | 19 | 20 | 21 | 22 | 23 |
| | 16 | 17 | 18 | 19 | 20 | 21 | 22 | 23 | 24 | 25 | 26 | 27 | 28 | 29 | 30 | 31 |
| | 24 | 25 | 26 | 27 | 28 | 29 | 30 | 31 | 0 | 1 | 2 | 3 | 4 | 5 | 6 | 7 |

Embodiment 4

Embodiment 4 according to the present invention relates to a codebook subsampling method in a mode 2-1.

First of all, it may apply a method of Table 28 to perform codebook subsampling for a rank 2. If W1 PMI is less than 8, a selection vector of W2 corresponds to (e1, e2), (e2, e2). Otherwise, the selection vector of W2 corresponds to (e2, e2), (e3, e3). As a result, it is able to make a feedback on a precoder consisting of DFT indexes represented by a bold face in Table 29. In particular, a UE can make a feedback on a precoder using total 32 DFT vectors. It is able to prevent beams from being cornered in specific direction in a codebook space by subsampling DFT matrixes with a same space. By doing so, it is able to reduce codebook performance degradation caused by the subsampling.

A co-phasor can select (1, −1) or (j, −j).

TABLE 28

| RI | #bits | PMI for W2 values | total #bits |
|---|---|---|---|
| 2 | 2 | If PMI for W1 is less than 8, {0, 1, 2, 3}, otherwise {2, 3, 4, 5} | 2 |

TABLE 29

| | W1 PMI | | | | | | | | | | | | | | | |
|---|---|---|---|---|---|---|---|---|---|---|---|---|---|---|---|---|
| Scheme | 0 | 1 | 2 | 3 | 4 | 5 | 6 | 7 | 8 | 9 | 10 | 11 | 12 | 13 | 14 | 15 |
| DFT vector index | 0 | 1 | 2 | 3 | 4 | 5 | 6 | 7 | 8 | 9 | 10 | 11 | 12 | 13 | 14 | 15 |
| | 8 | 9 | 10 | 11 | 12 | 13 | 14 | 15 | 16 | 17 | 18 | 19 | 20 | 21 | 22 | 23 |
| | 16 | 17 | 18 | 19 | 20 | 21 | 22 | 23 | 24 | 25 | 26 | 27 | 28 | 29 | 30 | 31 |
| | 24 | 25 | 26 | 27 | 28 | 29 | 30 | 31 | 0 | 1 | 2 | 3 | 4 | 5 | 6 | 7 |

Table 30 corresponds to a table that a co-phasor component is fixed by (1, −1) in Table 28 and the table to which (e1, e2), (e2, e2) selection vectors are added. As a result, DFT beams of two layers different from each other can be configured. This helps a more accurate codebook to be generated on an uncorrelated channel of which dependency is low between layers.

TABLE 30

| RI | #bits | PMI for W2 values | total #bits |
|---|---|---|---|
| 2 | 2 | If PMI for W1 is less than 8, {0, 2, 8}, otherwise {2, 4, 10} | 2 |

And, in PUCCH feedback mode 2-1, it is able to apply Table 31 as a method of performing codebook subsampling for a rank 2. If W1 PMI is less than 8, a selection vector of W2 makes a feedback on selection vector (e1, e1), (e2, e2), (e3, e3), (e4, e4). In this case, a co-phasor is fixed by (1, −1). If the W1 PMI is equal to or greater than 8, the selection vector of W2 make a feedback on selection vector (e1, e2), (e2, e3), (e1, e4), (e2, e4). In this case, a co-phasor is fixed by (1, −1).

TABLE 31

| RI | #bits | PMI for W2 values | total #bits |
|---|---|---|---|
| 2 | 2 | If PMI for W1 is less than 8, {0, 2, 4, 6}, otherwise {8, 10, 12, 14} | 2 |

A reason for differentiating subsampling of W2 on the basis of W1 PMI 8 is described in the following. As mentioned in the foregoing description, W1 PMI 0 to 7 already has all of total 32 DFT vectors and W1 PMI 8 to 15 represents overlapped DFT vectors. In consideration of this, if selection vectors (e1, e1), (e2, e2), (e3, e3), (e4, e4) are subsampled irrespective of W1, a precoder calculated when the W1 PMI has values ranging from 0 to 7 and a precoder calculated when the W1 PMI has values ranging from 8 to 15 are overlapped with each other. In order to prevent the overlap from being occurred, it is preferable to differently perform subsampling on a selection vector of which the W1 PMI is equal to or greater than 8 and a selection vector of which the W1 PMI is equal to or less than 7.

Selection vectors (e1, e2), (e2, e3), (e1, e4), (e2, e4) can more precisely 2 represent a channel of a widely spaced X-pol antenna in a manner of differently configuring a DFT vector constructing two layers of a codeword. As a space between antennas increases, a channel correlation between the antennas decreases. Consequently, it is efficient to generate a codebook to make a correlation between beams transmitting each layer to be decreased.

In case of a widely spaced X-pol antenna, when a UE makes a feedback on W1, the UE is able to perform more delicate feedback in a manner of making a feedback on values between PMI 8 and 15. In case of a closely spaced X-pol antenna, the UE is able to perform more delicate feedback in a manner of making a feedback on values between PMI 0 and 7.

In Table 31, when W1 PMI is equal to or greater than 8 for a widely spaced X-pol, a UE makes feedback on W2 {8, 10, 12, 14}. As a result, the UE should always differently configure a DFT vector constructing two layers of a codeword until a next W1 PMI is configured to be equal to or less than 7. When X-pol antennas are separated from each other as much as dozens of times of a wavelength, the aforementioned subsampling scheme is efficient. Yet, if the X-pol antennas are separated from each other as much as several times of a wavelength (e.g., 4 times), the aforementioned scheme is not an optimized scheme.

In particular, when a correlation between antennas is secured to some extent, in some cases, it may be preferable that DFT vector constructing two layers are different from each other. Yet, in some cases, if the DFT vector constructing two layers is identical to each other, it is helpful in representing a more precise channel. Hence, a subsampling scheme performed in a manner of mixing a part of {8, 10, 12, 14} and a part of {0, 2, 4, 6} with each other is efficient.

As an example, it may apply such a subsampling method as Table 32. In Table 32, when W1 PMI is equal to or greater than 8, a selection vector of W2 makes a feedback on selection vectors (e1, e2), (e3, e3), (e2, e3), (e1, e4) and a co-phasor is fixed by (1, −1).

TABLE 32

| RI | #bits | PMI for W2 values | total #bits |
|---|---|---|---|
| 2 | 2 | If PMI for W1 is less than 8, {0, 2, 4, 6}, otherwise {0, 4, 10, 12} | 2 |

In Table 32, when W1 PMI is equal to or greater than 8, selection vectors (e1, e1), (e3, e3) are fed back. When W1 PMI is less than 8, (e1, e1), (e3, e3) are also included in selection vectors capable of being fed back. Hence, there exists an overlapped codeword. In order to solve the problem, a co-phasor is fixed by (1, −1) when W1 PMI is less than 8 and the co-phasor is fixed by (j, −j) when W1 PMI is equal to greater than 8. As an example, it is able to perform subsampling as shown in Table 33 in the following.

TABLE 33

| RI | #bits | PMI for W2 values | total #bits |
|---|---|---|---|
| 2 | 2 | If PMI for W1 is less than 8, {0, 2, 4, 6}, otherwise {1, 5, 11, 13} | 2 |

In Table 33 and Table 32, selection vectors are identical to each other but a co-phasor is different from each other. When W1 PMI is equal to or greater than 8, although selection vector corresponds to (e2, e3), (e1, e4), a co-phasor (j, −j) is fed back in a manner of fixing the co-phasor by (j, −j). Yet, if selection vector corresponds to (e2, e3), (e1, e4), an overlapped codeword does not occur. Hence, although the co-phasor is fixed by (1, −1), a problem does not occur on codebook performance.

In Table 32, if W1 PMI is equal to or greater than 8, it is able to perform such subsampling as Table 34 in a manner of transforming selection vectors into (e1, e1), (e3, e3), (e1, e2), (e2, e3).

TABLE 34

| RI | #bits | PMI for W2 values | total #bits |
|---|---|---|---|
| 2 | 2 | If PMI for W1 is less than 8, {0, 2, 4, 6}, otherwise {0, 4, 8, 10} | 2 |

In Table 33, if W1 PMI is equal to or greater than 8, it is able to perform such subsampling as Table 35 in a manner of transforming selection vectors into (e1, e1), (e3, e3), (e1, e2), (e2, e3).

TABLE 35

| RI | #bits | PMI for W2 values | total #bits |
|---|---|---|---|
| 2 | 2 | If PMI for W1 is less than 8, {0, 2, 4, 6}, otherwise {1, 5, 9, 11} | 2 |

In Table 32, if W1 PMI is equal to or greater than 8, it is able to perform such subsampling as Table 36 in a manner of transforming selection vectors into (e1, e1), (e3, e3), (e1, e2), (e2, e4).

TABLE 36

| RI | #bits | PMI for W2 values | total #bits |
|---|---|---|---|
| 2 | 2 | If PMI for W1 is less than 8, {0, 2, 4, 6}, otherwise {0, 4, 8, 14} | 2 |

In Table 33, if W1 PMI is equal to or greater than 8, it is able to perform such subsampling as Table 37 in a manner of transforming selection vectors into (e1, e1), (e3, e3), (e1, e2), (e2, e4).

TABLE 37

| RI | #bits | PMI for W2 values | total #bits |
|---|---|---|---|
| 2 | 2 | If PMI for W1 is less than 8, {0, 2, 4, 6}, otherwise {1, 5, 9, 15} | 2 |

Meanwhile, in the present specification, a part of co-phasors is subsampled only among total co-phasors due to a limitation according to a CSI payload size. Yet, if an available payload size for CSI feedback increases, it may be able to additionally apply a co-phasor to the aforementioned subsampling scheme. In particular, in case of a rank 1, {1, −1} or {1, −1, j, −j} co-phasors can be additionally applied to the aforementioned subsampling scheme. In case of a rank 2, a (j, −j) co-phasor can be additionally applied to the aforementioned subsampling scheme.

Figure 16:
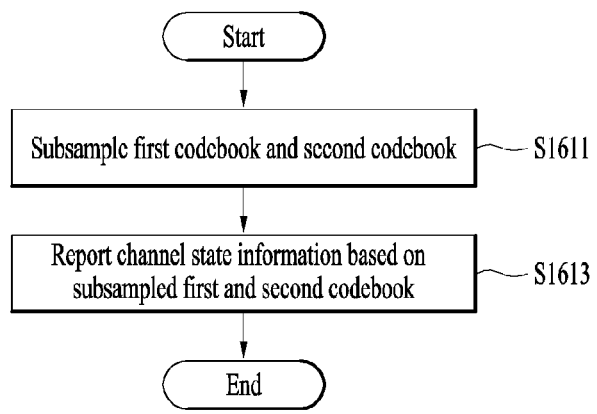
FIG. 16 is a flowchart for a method of reporting channel state information according to one embodiment of the present invention.

FIG. 16 is a flowchart for a method of reporting channel state information according to one embodiment of the present invention.

In the step S161, a UE subsamples a first codebook associated with a first PMI (precoding matrix indicator) and a second codebook associated with a second PMI according to a reporting submode for 4 antenna ports.

Since a detail subsampling method is identical to the subsampling method mentioned earlier in the second embodiment, explanation on the detail subsampling method is omitted at this time.

In the step S163, the UE reports channel state information based on the subsampled first codebook and the second codebook.

In this case, if a first codebook index for the first PMI corresponds to an add number, a second codebook index for the second PMI has an index belonging to a first index group. If the first codebook index corresponds to an even number, the second codebook index for the second PMI has an index belonging to a second index group.

In case of performing a method of transmitting channel state information according to the present invention, items mentioned earlier in various embodiments of the present invention can be independently applied or two or more embodiments can be applied at the same time. For clarity, explanation on duplicated contents is omitted at this time.

And, the principle proposed by the present invention can be identically applied to MIMO transmission (in backhaul uplink and backhaul downlink) between a base station and a relay and uplink MIMO transmission and reception for MIMO transmission (in access uplink and access downlink) between a relay and a UE.

Figure 17:
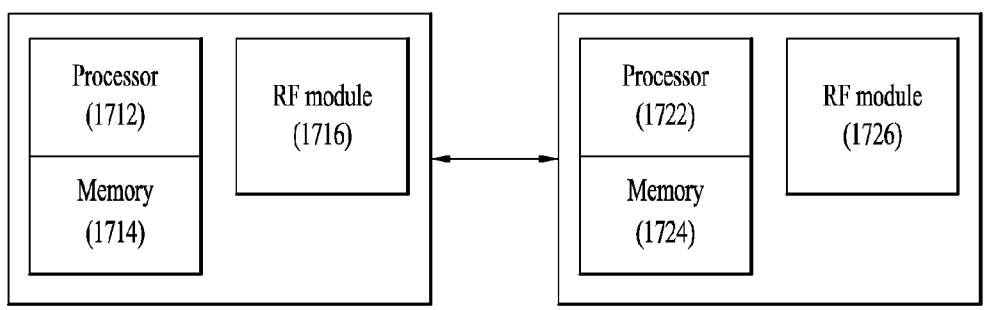
FIG. 17 is a diagram for a base station and a user equipment applicable to one embodiment of the present invention.

Base Station and User Equipment to which Embodiment of the Present Invention is Applicable FIG. 17 is a diagram for an example of a base station and a user equipment capable of being applied to an embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 17, a wireless communication system includes a base station (BS) 1710 and a user equipment (UE) 1720. The BS 1710 includes a processor 1712, a memory 1714 and a radio frequency (RF) unit 1716. The processor 1712 can be configured to implement the proposed functions, processes and/or methods. The memory 1714 is connected with the processor 1712 and then stores various kinds of information associated with an operation of the processor 1712. The RF unit 1716 is connected with the processor 1712 and transmits and/or receives a radio signal. The user equipment 1720 includes a processor 1722, a memory 1724 and a radio frequency (RF) unit 1726. The processor 1722 can be configured to implement the proposed functions, processes and/or methods. The memory 1724 is connected with the processor 1722 and then stores various kinds of information associated with an operation of the processor 1722. The RF unit 1726 is connected with the processor 1722 and transmits and/or receives a radio signal. The base station 1710 and/or the user equipment 1720 may have a single antenna or multiple antennas. The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The present invention can be used for such a wireless communication device as a user equipment, a relay, a base station and the like.

What is claimed is:

1. A method for transmitting channel state information (CSI) by a user equipment in a wireless communication system, the method comprising:
    subsampling a first codebook associated with a first PMI (precoding matrix indicator) and a second codebook associated with a second PMI according to a reporting submode for 4 antenna ports,
    wherein the subsampling, for selecting Discrete Fourier Transform (DFT) vectors, comprises selecting a second codebook index for the second PMI based on a first codebook index for the first PMI,
    wherein the DFT vectors selected are odd-numbered vectors of vectors of a beam group constructing the first codebook if the first codebook index corresponds to an even number, and
    wherein the DFT vectors selected are even-numbered vectors of the vectors of the beam group if the first codebook index corresponds to an odd number; and
    transmitting the channel state information based on the subsampled first codebook and the second codebook.

2. The method of claim 1, wherein if a rank corresponds to 1 and the first codebook index corresponds to the even number, the second codebook index has a value selected from the group consisting of 0 and 8.

3. The method of claim 1, wherein if a rank corresponds to 1 and the first codebook index corresponds to the odd number, the second codebook index has a value selected from the group consisting of 2and 6.

4. The method of claim 1, wherein if a rank corresponds to 2 and the first codebook index corresponds to the even number, the second codebook index has a value of either 0 or 4.

5. The method of claim 1, wherein a rank corresponds to 2 and the first codebook index corresponds to the odd number, the second codebook index has a value of either 2 or 6.

6. The method of claim 1, wherein the first PMI corresponds to a PMI of a wideband/long-term, wherein the second PMI corresponds to a PMI of a narrowband/short-term and wherein a final PMI is determined based on the first PMI and the second PMI.

7. The method of claim 1, wherein the reporting submode corresponds to a second submode of a PUCCH (physical uplink control channel) mode 1-1 reporting a PMI and a wideband CQI (channel quality indicator).

8. A user equipment for transmitting channel state information (CSI) in a wireless communication system, the user equipment comprising:
an RF (radio frequency) unit; and
a processor, the processor configured to subsample a first codebook associated with a first PMI (precoding matrix indicator) and a second codebook associated with a second PMI according to a reporting submode for 4 antenna ports, the processor configured to transmit the channel state information, via the RF unit, based on the subsampled first codebook and the second codebook,
wherein the subsampling, for selecting Discrete Fourier Transform (DFT) vectors, comprises selecting a second codebook index for the second PMI based on a first codebook index for the first PMI,
wherein the DFT vectors selected are odd-numbered vectors of vectors of a beam group constructing the first codebook if the first codebook index corresponds to an even number, and
wherein the DFT vectors selected are even-numbered vectors of the vectors of the beam group if the first codebook index corresponds to an odd number.

9. The user equipment of claim 8, wherein if a rank corresponds to 1 and the first codebook index corresponds to the even number, the second codebook index has a value selected from the group consisting of 0 and 8.

10. The user equipment of claim 8, wherein if a rank corresponds to 1 and the first codebook index corresponds to the odd number, the second codebook index has a value selected from the group consisting of 2and 6.

11. The user equipment of claim 8, wherein if a rank corresponds to 2 and the first codebook index corresponds to the even number, the second codebook index has a value of either 1 or 4.

12. The user equipment of claim 8, wherein if a rank corresponds to 2 and the first codebook index corresponds to the odd number, the second codebook index has a value of either 2 or 6.

13. The user equipment of claim 8, wherein the first PMI corresponds to a PMI of a wideband/long-term, wherein the second PMI corresponds to a PMI of a narrowband/short-term and wherein a final PMI is determined based on the first PMI and the second PMI.

14. The user equipment of claim 8, wherein the reporting submode corresponds to a second submode of a PUCCH (physical uplink control channel) mode 1-1 reporting a PMI and a wideband CQI (channel quality indicator).

* * * * *